(12) United States Patent
Miyake et al.

(10) Patent No.: US 8,352,147 B2
(45) Date of Patent: Jan. 8, 2013

(54) VEHICLE CONTROL DEVICE

(75) Inventors: Takafumi Miyake, Tokyo (JP); Koki Hayashi, Tokyo (JP)

(73) Assignee: Equos Research Co., Ltd., Tokyo (JP)

( * ) Notice: Subject to any disclaimer, the term of this patent is extended or adjusted under 35 U.S.C. 154(b) by 190 days.

(21) Appl. No.: 12/734,582

(22) PCT Filed: Oct. 23, 2008

(86) PCT No.: PCT/JP2008/069190
§ 371 (c)(1),
(2), (4) Date: Jul. 20, 2010

(87) PCT Pub. No.: WO2009/069410
PCT Pub. Date: Jun. 4, 2009

(65) Prior Publication Data
US 2010/0299044 A1   Nov. 25, 2010

(30) Foreign Application Priority Data
Nov. 26, 2007 (JP) ................................ 2007-303949

(51) Int. Cl.
*G08G 1/09* (2006.01)
*B62K 3/00* (2006.01)
*B62K 17/00* (2006.01)

(52) U.S. Cl. .......................................... 701/96; 701/117

(58) Field of Classification Search .................... 701/96, 701/117
See application file for complete search history.

(56) References Cited

U.S. PATENT DOCUMENTS

| 5,014,200 A | * | 5/1991 | Chundrlik et al. | 701/96 |
| 5,777,451 A | * | 7/1998 | Kobayashi et al. | 318/587 |
| 5,934,399 A | * | 8/1999 | Iiboshi et al. | 180/169 |
| 6,748,312 B2 | * | 6/2004 | Russell et al. | 701/96 |
| 7,623,956 B2 | * | 11/2009 | Kawaguchi | 701/117 |

(Continued)

FOREIGN PATENT DOCUMENTS

JP       A 5-170008       7/1993

(Continued)

OTHER PUBLICATIONS

JPO machine translation of JP 2005-297612.*

(Continued)

*Primary Examiner* — James P Trammell
*Assistant Examiner* — David Testardi
(74) *Attorney, Agent, or Firm* — Oliff & Berridge, PLC

(57) ABSTRACT

To provide a vehicle control device that improves the accuracy of an automatic follow-up control in an inverted pendulum vehicle, a vehicle control device according to the present invention performs an automatic follow-up running control in an inverted pendulum vehicle so as to automatically follow a preceding vehicle. The vehicle control device is characterized by including: a communication unit that receives running condition data from the preceding vehicle regarding a vehicle speed and a joystick operation amount of the preceding vehicle; an inter-vehicle distance sensor that measures an inter-vehicle distance with the preceding vehicle; and a main control ECU that computes an acceleration command value for following the preceding vehicle, wherein the main control ECU sets one of a first acceleration command value, which is computed based on the vehicle speed of the preceding vehicle acquired through the communication unit and the inter-vehicle distance measured by the inter-vehicle distance sensor, and a second acceleration command value, which is computed based on the joystick operation amount acquired through the communication unit, as a target acceleration command value.

16 Claims, 12 Drawing Sheets

U.S. PATENT DOCUMENTS

| | | | |
|---|---|---|---|
| 8,073,575 B2 * | 12/2011 | Tachibana et al. | 701/1 |
| 8,086,396 B1 * | 12/2011 | Farwell et al. | 701/482 |
| 2008/0312802 A1 | 12/2008 | Kaigawa et al. | |
| 2010/0030397 A1 | 2/2010 | Tachibana et al. | |

FOREIGN PATENT DOCUMENTS

| | | | | |
|---|---|---|---|---|
| JP | 09282599 A | * | 10/1997 | |
| JP | A 10-105880 | | 4/1998 | |
| JP | A 2000-339600 | | 12/2000 | |
| JP | A 2001-273588 | | 10/2001 | |
| JP | 2002166824 A | * | 6/2002 | |
| JP | 2002316552 A | * | 10/2002 | |
| JP | 2003327010 A | * | 11/2003 | |
| JP | 2004010003 A | * | 1/2004 | |
| JP | A 2004-129435 | | 4/2004 | |
| JP | 2005297612 A | * | 10/2005 | |
| JP | 2006088770 A | * | 4/2006 | |
| JP | 2006088771 A | * | 4/2006 | |
| JP | A 2006-232240 | | 9/2006 | |
| JP | A 2006-297993 | | 11/2006 | |
| JP | 2007237966 A | * | 9/2007 | |
| JP | 2008155740 A | * | 7/2008 | |
| WO | WO 2006/137545 A1 | | 12/2006 | |

OTHER PUBLICATIONS

International Search Report issued for International Application No. PCT/JP2008/069190 on Jan. 27, 2009 (with translation).

* cited by examiner

WHEN RIDING SECTION IS MOVED

WHEN RIDING SECTION IS NOT MOVED

VEHICLE CONTROL DEVICE

TECHNICAL FIELD

The present invention relates to a control device for a vehicle that utilizes an inverted pendulum attitude control, for example. More specifically, the present invention relates to a vehicle control device for performing automatic follow-up running in a plurality of vehicles.

BACKGROUND ART

Vehicles that utilize an inverted pendulum attitude control (hereinafter simply referred to as "inverted pendulum vehicles") have been drawing attention in recent years. For example, Patent Document 1 (Japanese Patent Application Publication No. JP-A-2004-129435) proposes a conveying apparatus that utilizes an inverted pendulum attitude control.

Meanwhile, conventional automatic driving systems are known that automatically drive a vehicle such as an automobile. Under such automatic driving systems, it is often more preferable for a plurality of automobiles traveling on an expressway or the like to form a line and travel as a vehicle group rather than as individual vehicles from the standpoints of saving labor, mitigating traffic, and the like. Therefore, various research has been carried out regarding how following vehicles form a line with respect to a preceding vehicle and to what extent follow-up running is automatically performed with respect to a preceding vehicle in automatic driving systems. Art related to such follow-up running is described in Patent Document 2 (Japanese Patent Application Publication No. JP-A-2001-273588), for example.

Patent Document 1: Japanese Patent Application Publication No. JP-A-2004-129435

Patent Document 2: Japanese Patent Application Publication No. JP-A-2001-273588

DISCLOSURE OF THE INVENTION

Problems to be Solved by the Invention

To prevent the vehicle body of an inverted pendulum vehicle from falling over due to inertial force when braking the vehicle, an acceleration torque is applied once to the vehicle wheel before braking to incline the vehicle body rearward, and then after a predetermined rearward inclination angle has been achieved, a braking torque is applied to the vehicle wheel to start braking.

An automatic follow-up running control in an inverted pendulum vehicle that behaves as described above during braking will be examined here. In this case, an example using two vehicles will be considered for simplicity. Specifically, an example in which a following vehicle automatically follows a preceding vehicle in accordance with a rider's driving operation will be considered.

When the preceding vehicle initiates braking, an acceleration for inclining the vehicle body rearward is started that increases the wheel rotational acceleration of the preceding vehicle. Thus, the difference between the wheel rotational speeds of the preceding vehicle and the following vehicle increases. Consequently, an acceleration command value of the following vehicle becomes larger than an immediately prior acceleration command value. When the preceding vehicle subsequently achieves the target vehicle body inclination angle and starts to brake, the following vehicle is given a deceleration command to follow such behavior, and an acceleration for inclining the vehicle body of the following vehicle rearward is started.

Thus, the timing at which the following vehicle initiates braking is delayed with respect to the timing at which the preceding vehicle initiates braking. This results in reduced accuracy of the automatic follow-up control in the following vehicle, and at worse, may result in an inability to perform follow-up running.

Note that the same problems may occur in the following vehicle during acceleration of the preceding vehicle and the like.

In summary, in preparatory operations before acceleration and braking of inverted pendulum vehicles, a counter-direction operation is performed, namely an operation is performed once in the direction of acceleration in preparation for braking and once in the direction of braking in preparation for acceleration (with such operations hereinafter referred to as "counter operations"). If an automatic follow-up running control is performed in the inverted pendulum vehicles for such operations, the following vehicle ends up reacting to the preparatory operation for braking or acceleration of the preceding vehicle, which causes a delay in the automatic follow-up running control of the following vehicle and lowers control accuracy.

Means for Solving the Problems

In order to solve the above problems, an invention according to claim 1 is a vehicle control device controlling a vehicle so as to follow a preceding vehicle performing an inversion control. The vehicle control device is characterized by including: a communication unit that receives a vehicle speed of the preceding vehicle and an operation amount of a maneuvering device that maneuvers the preceding vehicle; an inter-vehicle distance sensor that measures an inter-vehicle distance between the preceding vehicle and the vehicle following the preceding vehicle; and computation means that computes an acceleration command value of the vehicle following the preceding vehicle, wherein the computation means sets one of a first acceleration command value, which is computed based on the vehicle speed of the preceding vehicle received by the communication unit and the inter-vehicle distance measured by the inter-vehicle distance sensor, and a second acceleration command value, which is computed based on the operation amount of the maneuvering device received by the communication unit, as a target acceleration command value.

An invention according to claim 2 is characterized in that, in the vehicle control device of claim 1, the computation means sets a smaller value among the first acceleration command value and the second acceleration command value as the target acceleration command value if output of a deceleration command to the preceding vehicle is determined based on the operation amount of the maneuvering device.

An invention according to claim 3 is characterized in that, in the vehicle control device of claim 1 or 2, the computation means sets a larger value among the first acceleration command value and the second acceleration command value as the target acceleration command value if output of an acceleration command to the preceding vehicle is determined based on the operation amount of the maneuvering device.

An invention according to claim 4 is a vehicle control device controlling a vehicle so as to follow a preceding vehicle performing an inversion control. The vehicle control device is characterized by including: a communication unit that receives a vehicle speed of the preceding vehicle and an operation amount of a maneuvering device that maneuvers the preceding vehicle; an inter-vehicle distance sensor that measures an inter-vehicle distance between the preceding vehicle and the vehicle following the preceding vehicle; and computation means that computes an acceleration command value of the vehicle following the preceding vehicle, wherein the computation means sets one of a first acceleration command value, which is computed based on the vehicle speed of the preceding vehicle received by the communication unit and the inter-vehicle distance measured by the inter-vehicle distance sensor, and a second acceleration command value, which is computed based on an acceleration command value of the preceding vehicle received by the communication unit, as a target acceleration command value.

An invention according to claim 5 is characterized in that, in the vehicle control device of claim 4, the computation means sets a smaller value among the first acceleration command value and the second acceleration command value as the target acceleration command value if the acceleration command value of the preceding vehicle is determined to be negative.

An invention according to claim 6 is characterized in that, in the vehicle control device of claim 4 or 5, the computation means sets a larger value among the first acceleration command value and the second acceleration command value as the target acceleration command value if the acceleration command value of the preceding vehicle is determined to be not negative.

An invention according to claim 7 is a vehicle control device controlling a vehicle so as to follow a preceding vehicle performing an inversion control. The vehicle control device is characterized by including: a communication unit that receives a vehicle speed of the preceding vehicle and an operation amount of a maneuvering device that maneuvers the preceding vehicle; an inter-vehicle distance sensor that measures an inter-vehicle distance between the preceding vehicle and the vehicle following the preceding vehicle; and computation means that computes an acceleration command value of the vehicle following the preceding vehicle, wherein the computation means sets a second acceleration command value, which is computed based on an acceleration command value of the preceding vehicle received by the communication unit, as a target acceleration command value.

An invention according to claim 8 is characterized in that, in the vehicle control device of any one of claims 1 to 7, the vehicle speed is obtained from a wheel rotational speed.

Effects of the Invention

According to the vehicle control device of claim 1 in the present invention, one of a first acceleration command value, which is computed based on the vehicle speed of the preceding vehicle received by the communication unit and the inter-vehicle distance measured by the inter-vehicle distance sensor, and a second acceleration command value, which is computed based on the operation amount of the maneuvering device received by the communication unit, is set as a target acceleration command value. Therefore, no delay occurs in the automatic follow-up running control of the following vehicle and information regarding braking is transmitted without delay to the following vehicle, which can help avoid the risk of collision and realize a highly accurate automatic follow-up running control.

According to the vehicle control device of claim 2 in the present invention, a smaller value among the first acceleration command value and the second acceleration command value is set as the target acceleration command value if output of a deceleration command to the preceding vehicle is determined. Therefore, an automatic follow-up running control that enables the following vehicle to avoid a situation that may lead to a collision with the preceding vehicle can be realized.

According to the vehicle control device of claim 3 in the present invention, a larger value among the first acceleration command value and the second acceleration command value is set as the target acceleration command value if output of an acceleration command to the preceding vehicle is determined. Therefore, an automatic follow-up running control that enables the following vehicle to track the preceding vehicle without delay can be realized.

According to the vehicle control device of claim 4 in the present invention, one of a first acceleration command value, which is computed based on the vehicle speed of the preceding vehicle received by the communication unit and the inter-vehicle distance measured by the inter-vehicle distance sensor, and a second acceleration command value, which is computed based on an acceleration command value of the preceding vehicle received by the communication unit, is set as a target acceleration command value. Therefore, no delay occurs in the automatic follow-up running control of the following vehicle and information regarding braking is transmitted without delay to the following vehicle, which can help avoid the risk of collision and realize a highly accurate automatic follow-up running control.

According to the vehicle control device of claim 5 in the present invention, a smaller value among the first acceleration command value and the second acceleration command value is set as the target acceleration command value if the acceleration command value of the preceding vehicle is determined to be negative. Therefore, an automatic follow-up running control that enables the following vehicle to avoid a situation that may lead to a collision with the preceding vehicle can be realized.

According to the vehicle control device of claim 6 in the present invention, a larger value among the first acceleration command value and the second acceleration command value is set as the target acceleration command value if the acceleration command value of the preceding vehicle is determined to be not negative. Therefore, an automatic follow-up running control that enables the following vehicle to track the preceding vehicle without delay can be realized.

According to the vehicle control device of claim 7 in the present invention, a second acceleration command value, which is computed based on an acceleration command value of the preceding vehicle received by the communication unit, is set as a target acceleration command value. This is effective in cases that place particular importance on the follow-up capability of the following vehicle with respect to the preceding vehicle such as when follow-up is performed with a short inter-vehicle distance.

Figure 1A:
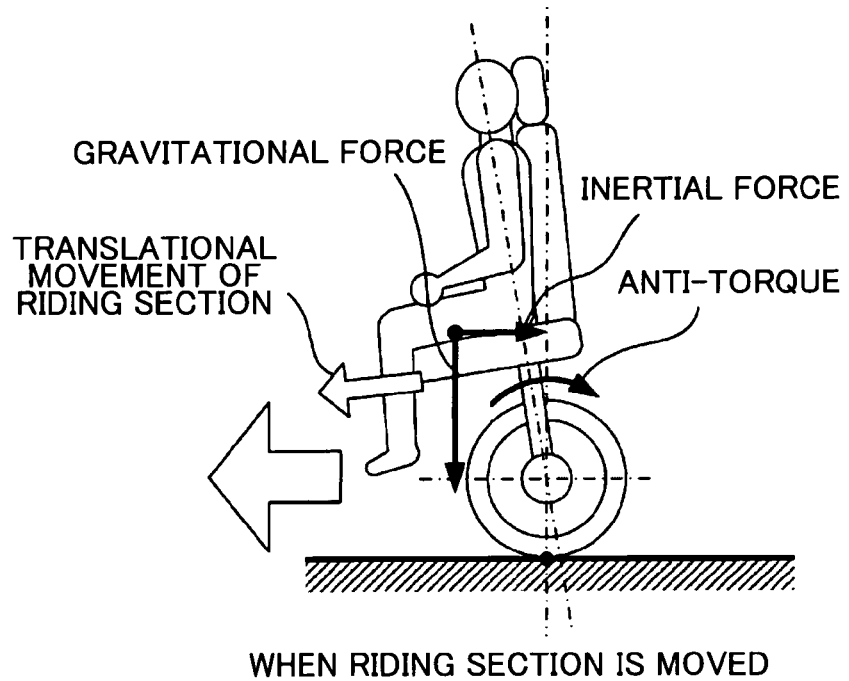
FIG. 1A shows an explanatory diagram of conditions of a vehicle accelerating with a smaller angle of inclination by moving a riding section forward according to an embodiment.

DESCRIPTION OF THE REFERENCE NUMERALS 11a, 11b: DRIVE WHEEL, 12: DRIVE MOTOR, 13: RIDING SECTION, 14: SUPPORT MEMBER, 16: CONTROL UNIT, 20: CONTROL ECU, 21: MAIN CONTROL ECU, 22: DRIVE WHEEL CONTROL ECU, 23: RIDING SECTION CONTROL ECU, 25: COMMUNICATION UNIT CONTROL ECU, 30: INPUT DEVICE, 31: JOYSTICK, 40: VEHICLE BODY CONTROL SYSTEM, 41: VEHICLE BODY INCLINATION SENSOR, 42: INTER-VEHICLE DISTANCE SENSOR, 50: DRIVE WHEEL CONTROL SYSTEM, 51: DRIVE WHEEL SENSOR, 52: DRIVE MOTOR, 60: RIDING SECTION CONTROL SYSTEM, 61: RIDING SECTION SENSOR, 62: RIDING SECTION MOTOR, 63: MOVEMENT MECHANISM, 80: COMMUNICATION CONTROL SYSTEM, 81: COMMUNICATION UNIT, 131: SEAT CUSHION PORTION, 132: SEAT BACK PORTION, 133: HEADREST

BEST MODES FOR CARRYING OUT THE INVENTION

Figure 1B:
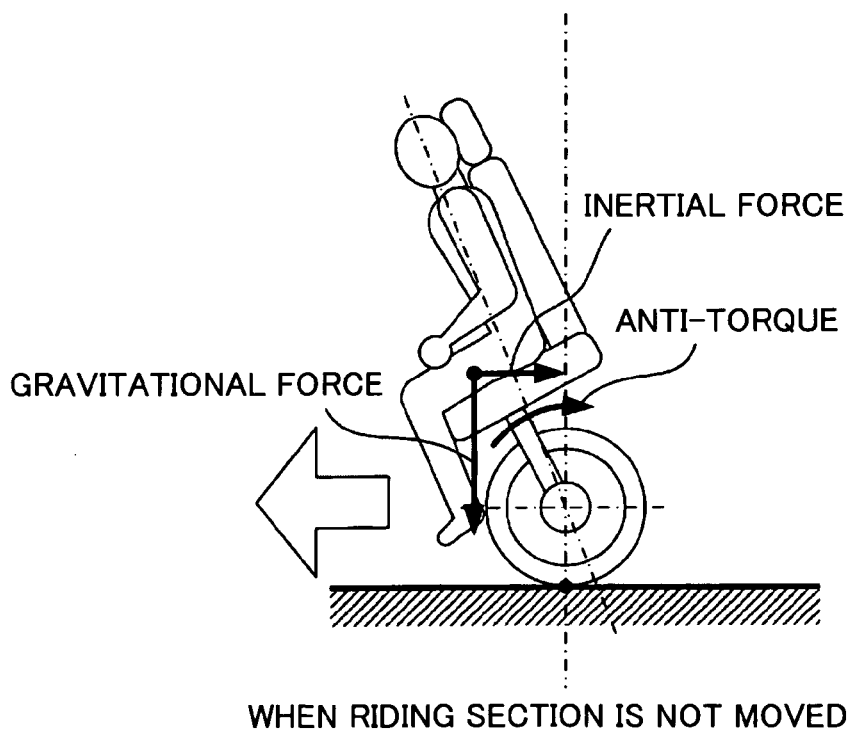
FIG. 1B shows an explanatory diagram of a vehicle accelerating with a larger angle of inclination when a riding section is not moved.

Hereinafter, embodiments of the present invention will be described with reference to the drawings. FIG. 1 shows conditions of acceleration with a small angle of inclination achieved through movement of a riding section in an embodiment. In this embodiment, the balance (inverted state) of a vehicle body is maintained by moving the riding section including a rider relatively translationally in a longitudinal direction of the vehicle. Specifically, referring to FIG. 1A, the riding section including the rider is moved translationally in an acceleration direction to maintain a balance of the vehicle body with an anti-torque of a drive wheel and inertial force accompanying acceleration acting thereon as a result of acceleration/deceleration according to a target running state (for example, acceleration, deceleration, or stop) based on an operation performed by the rider. Thus, the inclination angle of the vehicle body accompanied by the acceleration/deceleration can be reduced to provide a comfortable and safe inverted type vehicle.

The above control will be described in the present embodiment. Note that the embodiment may be configured so as to perform a control operation that counters with only movement of the riding section if an acceleration in accordance with the target running state is relatively small, and counters using the inclination angle of the vehicle body in addition to movement of the riding section if the acceleration is relatively large.

Figure 2:
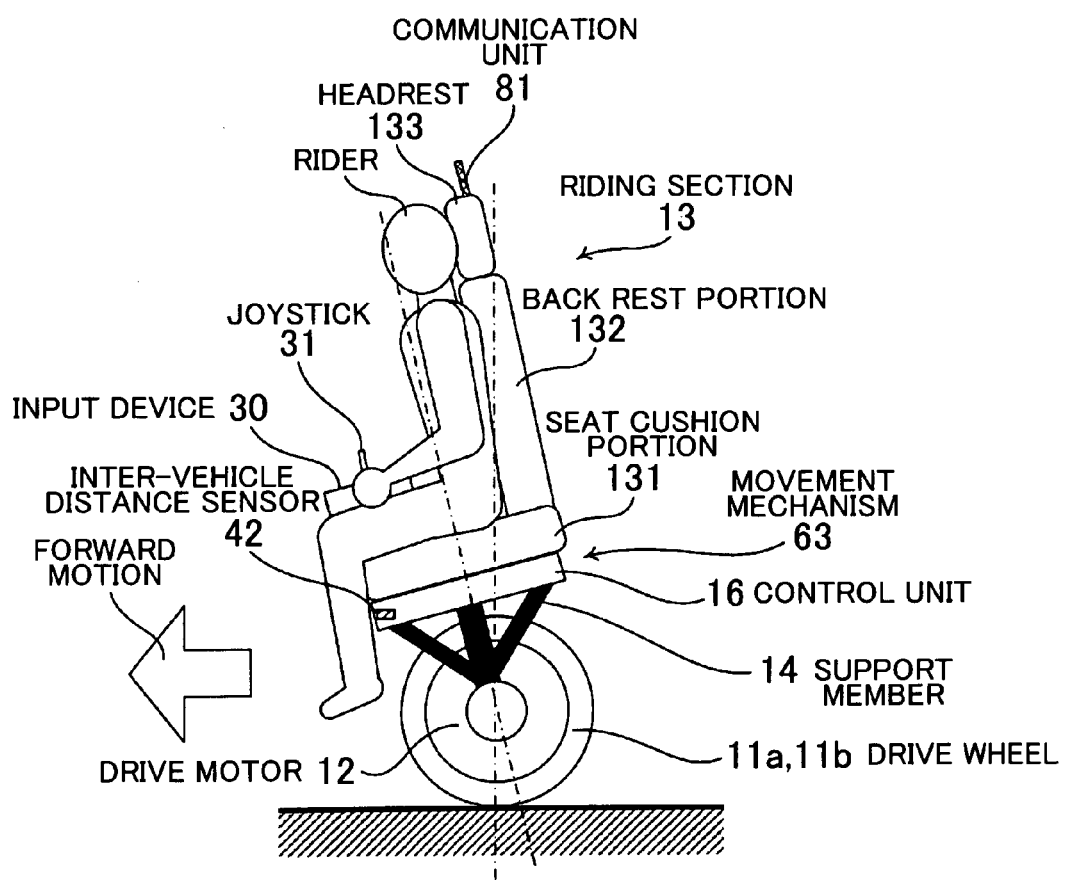
FIG. 2 is an exemplary diagram of the external configuration of a vehicle installed with a vehicle control device of the embodiment, in which the vehicle loaded with a rider runs in the forward direction.

FIG. 2 is an exemplary diagram of the external configuration of a vehicle installed with a vehicle control device of the present embodiment, in which the vehicle loaded with a rider runs in a forward direction. In FIG. 2, reference numerals 11a, 11b denote drive wheels, 12 denotes a drive motor, 13 denotes a riding section, 14 denotes a support member, 16 denotes a control unit, 30 denotes an input device, 31 denotes a joystick, 42 denotes an inter-vehicle distance sensor, 63 denotes a movement mechanism, 81 denotes a communication unit, 131 denotes a seat cushion portion, 132 denotes a seat back portion, and 133 denotes a headrest.

Referring to FIG. 2, the vehicle includes two drive wheels 11a, 11b disposed coaxially. The drive wheels 11a, 11b are driven by drive motors 12a, 12b, respectively. Note that, one or three or more drive wheels and drive motors may be disposed instead of coaxially disposing two each as described above.

The riding section 13 (seat) that carries a cargo, a rider, or other weight body is disposed above the drive wheels 11a, 11b (a drive wheel 11 to mean both drive wheels 11a, 11b collectively; the same holds true with other elements hereunder) and the drive motor 12.

The riding section 13 includes the seat cushion portion 131 on which the rider sits, the seat back portion 132, and the headrest 133.

The riding section 13 is supported by the support member 14 via the movement mechanism 63. The support member 14 is fixed to a drive motor cabinet in which the drive motor 12 is accommodated.

A linear guide system or other linear movement mechanism having low resistance is, for example, used as the movement mechanism 63. The position of the riding section 13 relative to the support member 14 is changed through the drive torque of a riding section drive motor.

The linear guide system includes a guide rail fixed to the support member 14, a slider fixed to the riding section drive motor, and a rolling body.

The guide rail includes two trackway grooves formed linearly longitudinally in right and left side surface portions of the guide rail.

The slider has a channel-shaped cross section. Two trackway grooves are formed inside two mutually opposing side surface portions of the channel shape so as to face the two trackway grooves, respectively, in the guide rail.

The rolling body is inserted between the abovementioned trackway grooves, rolling in the trackway grooves as the guide rail and the slider make linear motions relative to each other.

Additionally, the slider includes a return path formed therein, connecting both ends of the trackway grooves, so that the rolling body circulates through the trackway grooves and the return path.

The linear guide system includes a brake (clutch) that fixes the movement of the linear guide system. When the movement of the riding section is not required, such as when the vehicle is not moving, the slider is fixed onto the guide rail with the brake so as to maintain the positions of the support member 14 to which the guide rail is fixed and the riding section 13 to which the slider is fixed relative to each other. When the movement is required, the brake is released, so that the distance between a reference position on the side of the support member 14 and a reference position on the side of the riding section 13 can be controlled to be a predetermined value.

The input device 30 is disposed beside the riding section 13. The input device 30 includes the joystick 31 disposed thereon. The rider operates the joystick 31 to issue commands for acceleration, deceleration, turning, on-the-spot rotation, standing still, braking, and other operations of the vehicle. Although an example using a joystick as a maneuvering device is described in the present embodiment, other input devices may be used as the maneuvering device.

The input device 30 according to the present embodiment is fixed to the seat cushion portion 131. The input device 30 may instead be configured with a wired or wireless remote control, or disposed on an armrest additionally provided.

The input device 30 is disposed in the vehicle installed with the vehicle control device of the present embodiment, and the vehicle is controlled by the rider operating the joystick 31 of the input device 30. The vehicle control has two modes, a normal running mode that is based on such rider operation and an follow-up running mode that follows a preceding vehicle and is not based on rider operation. Although an example of a control device for a vehicle having both a normal running mode and a follow-up running mode is described in the present embodiment, the vehicle control device of the present invention may also be applied to a vehicle having only a follow-up running mode.

Note that, if the vehicle is controlled so as to run automatically according to predetermined travel command data, a travel command data acquisition section is disposed in place of the input device 30. The travel command data acquisition section may include, for example, data reading means acquiring the travel command data from various types of storage media such as a semiconductor memory, or/and communication control means acquiring the travel command data externally through wireless communications.

In FIG. 2, a human is on the riding section 13. However, the vehicle is not necessarily limited to an application of a human rider operating; rather, the vehicle may carry only a cargo or nothing and run or stop through, for example, remote control from an external environment or according to travel command data.

The inter-vehicle distance sensor 42 is provided in the control unit 16, and measures a distance between the host vehicle and a vehicle traveling in front of the host vehicle. The inter-vehicle distance sensor 42 may be formed of a laser radar, a millimeter wave radar, or an ultrasonic radar, for example. When executing the vehicle control of the follow-up running mode in the present embodiment, inter-vehicle distance information detected by the inter-vehicle distance sensor 42 is used. However, the inter-vehicle distance information may also be used for other vehicle controls.

The communication unit 81 is a communication device capable of transmitting information between vehicles and may employ a wireless or wired format. When executing the vehicle control of the follow-up running mode in the present embodiment, the communication unit 81 acquires predetermined information pertaining to a running condition and the like of the preceding vehicle from the communication unit 81 of the preceding vehicle, and provides such information for the vehicle control of the host vehicle.

The control unit 16 is disposed between the riding section 13 and the drive wheel 11. In the present embodiment, the control unit 16 is mounted on the support member 14.

The control unit 16 may be mounted on a lower surface of the seat cushion portion 131 of the riding section 13. In this case, the control unit is moved in the forward-backward direction with the riding section 13 by the movement mechanism 63.

The vehicle according to the present embodiment includes a battery among other miscellaneous types of devices. The battery, disposed on the support member 14, supplies electric power for drive and computational operations to, for example, the drive motor 12, the riding section drive motor, and a control ECU 20.

In the description given hereunder, a "drive wheel" collectively means the drive wheel 11, and parts fixed to and rotated with the drive wheel 11; a "vehicle body" means an entire vehicle including a rider, but excluding the drive wheel; and a "riding section" means the riding section 13, and parts (including the rider) fixed to and moved translationally with the riding section 13.

In the present embodiment, the "riding section" is formed of the riding section 13, the input device 30, and a part of the movement mechanism 63 (linear guide). The control unit 16 or the battery may be disposed on the riding section 13 so as to be included in the "riding section". This increases the weight of the "riding section" and a greater effect is thus produced from the movement of the "riding section".

Figure 3:
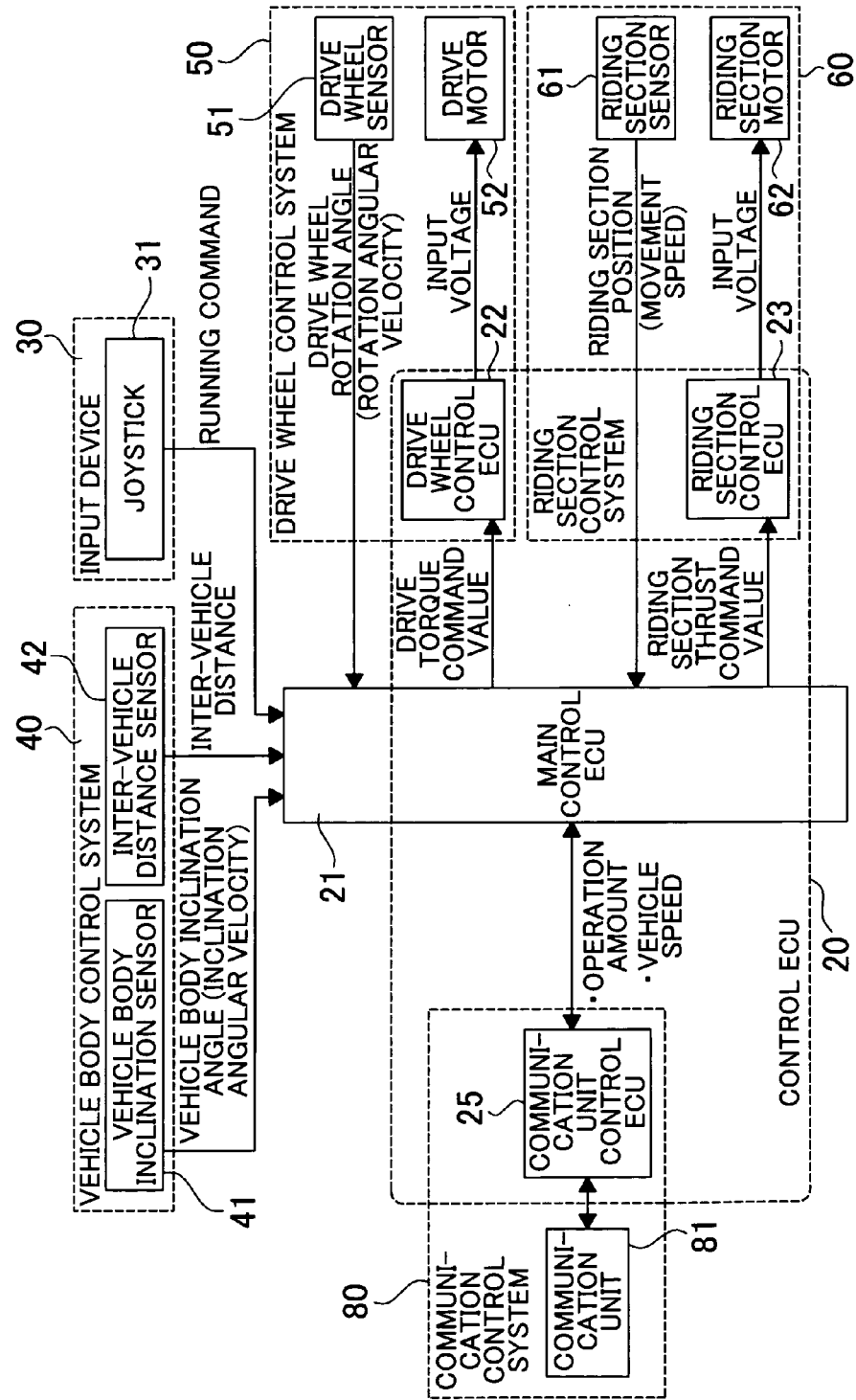
FIG. 3 is a block diagram of a control system in the vehicle control device according to the embodiment of the present invention.

FIG. 3 is a block diagram of a control system in the vehicle control device according to the embodiment of the present invention. In FIG. 3, reference numeral 20 denotes a control ECU, 21 denotes a main control ECU, 22 denotes a drive wheel control ECU, 23 denotes a riding section control ECU, 25 denotes a communication unit control ECU, 30 denotes an input device, 31 denotes a joystick, 40 denotes a vehicle body control system, 41 denotes a vehicle body inclination sensor, 42 denotes an inter-vehicle distance sensor, 50 denotes a drive wheel control system, 51 denotes a drive wheel sensor, 52 denotes a drive motor, 60 denotes a riding section control system, 61 denotes a riding section sensor, 62 denotes a riding section motor, 80 denotes a communication control system, and 81 denotes a communication unit.

The control system of the vehicle control device according to the present embodiment includes the control ECU (electronic control unit) 20 that functions as running and attitude control means, the joystick 31, the vehicle body inclination sensor 41, the inter-vehicle distance sensor 42, the drive wheel sensor 51, the drive motor 52 (same as the drive motor 12), the riding section sensor 61, the riding section motor 62 (riding section drive motor), the communication unit 81, and other devices.

The control ECU 20 includes the main control ECU 21, the drive wheel control ECU 22, the riding section control ECU 23, and the communication unit control ECU 25, and performs various types of controls including the vehicle running and attitude control through, for example, a drive wheel control and a vehicle body control (inversion control).

The control ECU 20 is formed of a computer system that includes a ROM that stores therein various programs and data, such as the running and attitude control process program in the present embodiment, a RAM used as a work area, an external storage device, and an interface portion.

The main control ECU 21 is connected to the drive wheel sensor 51, the vehicle body inclination sensor 41, the inter-vehicle distance sensor 42, the riding section sensor 61, and the joystick 31 as the input device 30.

The joystick 31 supplies the main control ECU 21 with a running command (maneuvering operation amount) based on an operation performed by the rider.

With its upright position defined as a neutral position, the joystick 31 is tilted in the forward-backward direction to command acceleration or deceleration and in the lateral direction to command lateral acceleration during turning. The requested acceleration/deceleration or lateral acceleration is greater with a larger tilt angle.

The vehicle body inclination sensor 41 functions as inclination detection means that detects the angle of inclination of the vehicle body and detects an inclination state of the vehicle body in the forward-backward direction about an axle of the drive wheel 11.

The vehicle body inclination sensor 41 includes an acceleration sensor that detects acceleration and a gyro sensor that detects a vehicle body inclination angular velocity. Accuracy of the vehicle body inclination sensor 41 is enhanced by calculating a vehicle body inclination angle $\theta_1$ from a detected vehicle body inclination angular velocity as well as from a detected acceleration. Instead, either one of the sensors may be disposed in the vehicle body inclination sensor 41 and the vehicle body inclination angle and/or the angular velocity may be calculated from a value detected thereby.

The inter-vehicle distance sensor 42 detects the distance between the host vehicle and a vehicle traveling in front of the host vehicle, and is formed of a laser radar, a millimeter wave radar, or an ultrasonic radar, for example. Inter-vehicle distance information detected by the inter-vehicle distance sensor 42 is used when the vehicle is in the follow-up running mode.

The main control ECU 21 functions as target running state acquisition means that acquires the target running state set as a target. Further, the main control ECU 21 functions as output determination means that determines the drive torque of the drive wheel and the movement thrust force of the riding section according to the acquired target running state.

The main control ECU 21 functions as target attitude determination means that determines a vehicle body inclination angle and a riding section position set as targets according to the target running state based on a signal from the joystick 31.

Additionally, the main control ECU 21 functions as feedforward output determination means that determines a feedforward output of each actuator (the drive motor 52 and the riding section motor 62) according to the target running state and a target attitude (the target vehicle body inclination angle and the target riding section position).

Further, the main control ECU 21 functions as feedback output determination means that determines a feedback output of the drive motor 52 according to a deviation in the vehicle body inclination angle between a target value and an actually measured value and a feedback output of the riding section motor 62 according to a deviation in the riding section position between a target value and an actually measured value.

When the vehicle is in the follow-up running mode, the main control ECU 21 determines an acceleration command in accordance with a running condition and the like of the preceding vehicle and determines a drive torque command of the drive wheel based on the acceleration command. In addition, when the vehicle is in the follow-up running mode, the main control ECU 21 determines the acceleration command in accordance with a running condition and the like of the preceding vehicle and determines the target running state and the target attitude.

The main control ECU 21 functions with the drive wheel control ECU 22 and the drive motor 52 as drive means, and a drive wheel control system 50 is formed by further including the drive wheel sensor 51 with the drive means.

The drive wheel sensor 51 detects a drive wheel rotation angle (rotation angular velocity) that represents a rotation state of the drive wheel 11 and supplies the main control ECU 21 with the drive wheel rotation angle. The drive wheel sensor 51 of the present embodiment is formed of a resolver, rotary encoder, or the like detecting the drive wheel rotation angle. The rotation angular velocity is calculated using this drive wheel rotation angle.

The main control ECU 21 supplies the drive wheel control ECU 22 with a drive torque command value and the drive wheel control ECU 22 supplies the drive motor 52 with an input voltage (drive voltage) corresponding to the drive torque command value. The drive motor 52 functions as a drive wheel actuator that applies to the drive wheel 11 the drive torque according to the input voltage.

Additionally, the main control ECU 21 forms the riding section control system 60 with the riding section control ECU 23, the riding section sensor 61, and the riding section motor 62.

The riding section sensor 61 functions as a position detector that detects a relative position of the riding section and supplies data that represents the detected riding section position (movement speed) to the main control ECU 21. The riding section sensor of the present embodiment is formed of an encoder detecting the riding section position. The movement speed of the riding section is calculated from a detected value of the riding section position.

The main control ECU 21 supplies the riding section control ECU 23 with a riding section thrust force command value. The riding section control ECU 23 supplies the riding section motor 62 with an input voltage (drive voltage) corresponding to the riding section thrust force command value. The riding section motor 62 functions as a riding section actuator that applies a thrust force for moving the riding section 13 translationally according to the input voltage.

Additionally, the main control ECU 21 forms the communication control system 80 with the communication unit control ECU 25 and the communication unit 81. The communication unit 81 performs vehicle-to-vehicle data communication in a wireless format, for example. Through the communication unit control ECU 25, the communication unit 81 inputs received data to the main control ECU 21 and transmits predetermined data output from the main control ECU 21.

Figure 4:
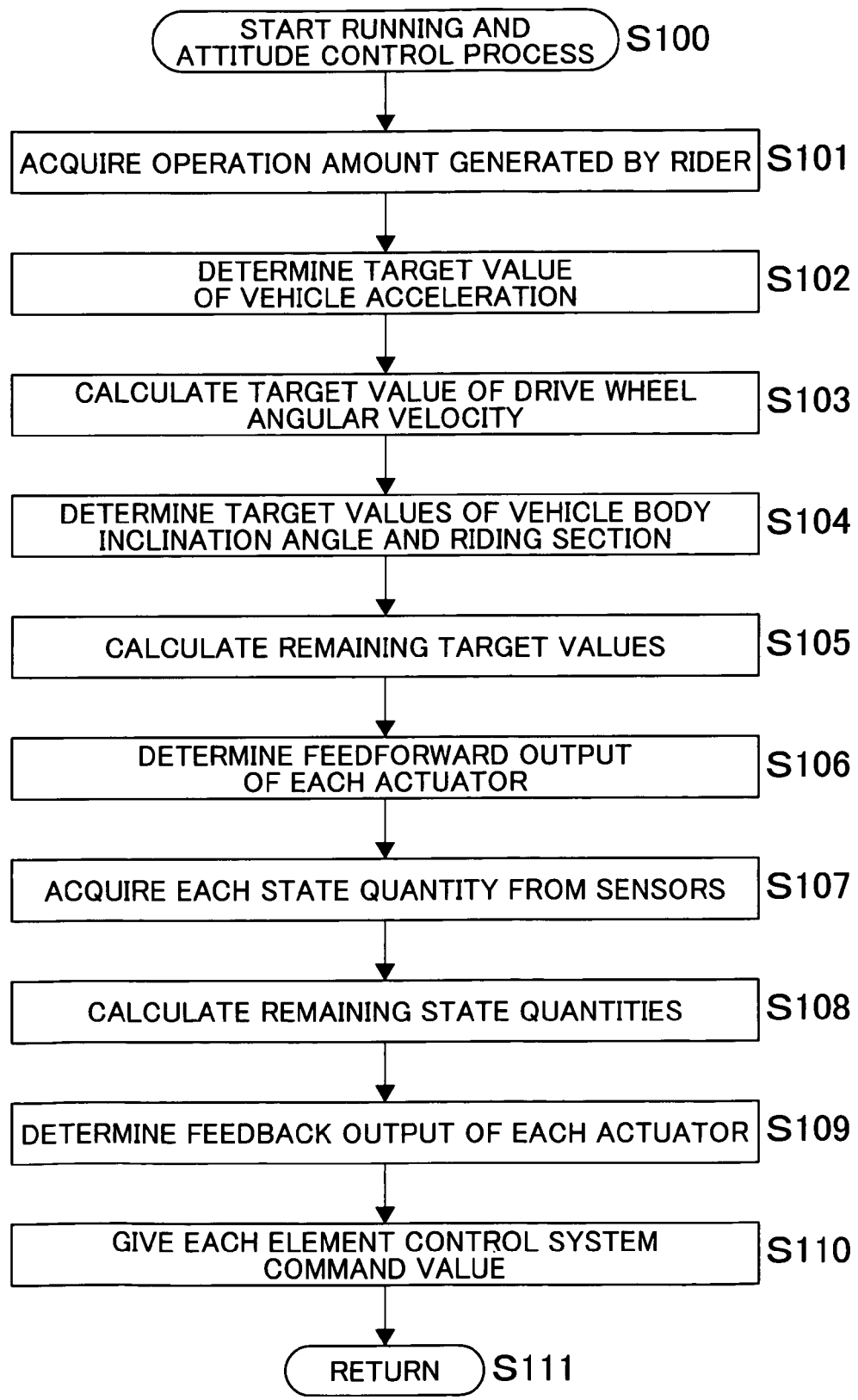
FIG. 4 is a flowchart of a running and attitude control in the vehicle control device according to the embodiment of the present invention.

A running and attitude control process performed by the vehicle having the above arrangement will be described below. FIG. 4 is a flowchart of the running and attitude control in the vehicle control device according to the embodiment of the present invention.

The entire running and attitude control process of the normal running mode will be outlined first.

The running and attitude control according to the present embodiment achieves the target running state, while maintaining the balance of the vehicle body, by controlling the vehicle body inclination or the riding section position according to the running state set as the target including, for example, acceleration, deceleration and stop.

Once the process of the flowchart is initiated at step S100 in FIG. 4, the main control ECU 21 first determines how the vehicle is moved according to an intention of the rider, specifically, the running target of the vehicle (steps S101 to S103).

The process proceeds to step S104, where the main control ECU 21 next determines a vehicle body target attitude (the target vehicle body inclination angle and the target riding section position) at which the balance of the vehicle body is maintained (makes the vehicle take an inverted attitude) under the determined running target.

By optimizing the vehicle body inclination amount and the riding section position as described above, the rider can feel an appropriate acceleration, while minimizing the vehicle body inclination to prevent riding comfort from being degraded.

At steps S105 to S110, the main control ECU 21 then determines output values of the drive motor 52 and the riding section motor 62 required for achieving the vehicle running state and the vehicle attitude set as targets. In accordance with the output values, actual outputs of the drive motor 52 and the riding section motor 62 are controlled using the drive wheel control ECU 22 and the riding section control ECU 23.

Details of the running and attitude control process will be described next.

At step S101, the main control ECU 21 acquires the maneuvering operation amount (running command) of the joystick 31 operated by the rider.

The process then proceeds to step S102, where the main control ECU 21 determines a target value of vehicle acceleration (vehicle target acceleration) $\alpha^*$ based on the acquired operation amount. A value proportional, for example, to the forward-backward operation amount of the joystick 31 is defined as the value of the vehicle target acceleration $\alpha^*$.

At step S103, using the determined vehicle target acceleration $\alpha^*$, the main control ECU 21 calculates a target value of the drive wheel angular velocity (drive wheel target angular velocity) $[\theta\omega^*]$.

Note that a symbol [n] represents a derivative of n with respect to time. For example, the vehicle target acceleration $\alpha^*$ is integrated with respect to time and divided by a predetermined drive wheel ground contact radius to arrive at a value as the drive wheel target angular velocity $[\theta\omega^*]$.

Next, at step S104, the main control ECU 21 determines the target values of the vehicle body inclination angle and riding section position. Specifically, the target value of the vehicle body inclination angle (target vehicle body inclination angle) $\theta_1^*$ is determined using Formulas (1) to (3) given below according to the magnitude of the vehicle target acceleration $\alpha^*$ determined at step S102.

Then, based on the determined target vehicle body inclination angle $\theta_1^*$, the target value of the riding section position (riding section target position) $\lambda_s^*$ is determined using Formulas (4) to (6) according to the magnitude of the vehicle target acceleration $\alpha^*$.

$\theta_1^* = \phi^* - \beta_{Max} + \sin^{-1}(\gamma \sin \phi^* \cos \beta_{Max})(\alpha^* < -\alpha_{Max})$ (Formula 1)

$\theta_1^* = (1 - C_{Sense})\phi^* (-\alpha_{Max} \leq \alpha^* < \alpha_{Max})$ (Formula 2)

$\theta_1^* = \phi^* + \beta_{Max} + \sin^{-1}(\gamma \sin \phi^* \cos \beta_{Max})(\alpha^* > \alpha_{Max})$ (Formula 3)

$\lambda_S^* = -\lambda_{S,Max}(\alpha^* < -\alpha_{Max})$ (Formula 4)

$\lambda_S^* = l_1(m_1/m_2)\{\tan(\phi^* - \theta_1^*) + \gamma(\sin \phi^*/\cos(\phi^* - \theta_1^*))\}$
$(-\alpha_{Max} \leq \alpha^* < \alpha_{Max})$ (Formula 5)

$\lambda_S^* = -\lambda_{S,Max}(\alpha^* > \alpha_{Max})$ (Formula 6)

In Formulas (1) to (6), $\phi^*$, $\beta_{Max}$, and $\gamma$ are as follows:
$\phi^* = \tan^{-1} \alpha^*$
$\beta_{Max} = \tan^{-1}(m_S \lambda_{S,Max}/m_1 l_1)$
$\lambda = M \sim R_W/m_1 l_1$ or $M \sim = m_1 + m_W + I_W/R_W^2$.
$\alpha^*$ is the vehicle target acceleration (G). $\lambda_{S,Max}$ is a set value representing the maximum riding section movement amount.

A threshold value $\alpha_{Max}$ is the vehicle target acceleration $\alpha^*$ when $\lambda_S^* = \lambda_{S,Max}$ in Formula (5), specifically, when the riding section has been moved to its stroke limit. The threshold value $\alpha_{Max}$ is a preset value, but cannot be obtained analytically. The threshold value $\alpha_{Max}$ is therefore determined, for example, through iterative calculation or with an approximate expression.

Figure 5:
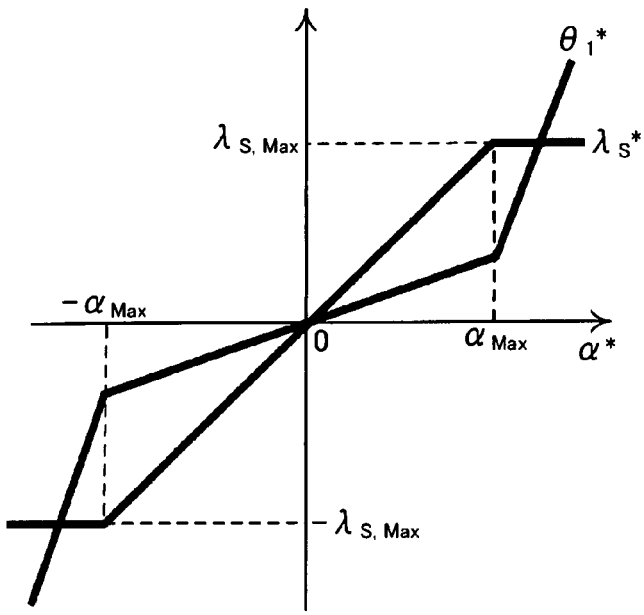
FIG. 5 is a diagram of a relationship between a vehicle target acceleration α* (abscissa), a target vehicle body inclination angle $\theta_1^*$, and a riding section target position $\lambda_S^*$.

FIG. 5 is a diagram showing a relationship between the vehicle target acceleration $\alpha^*$ (abscissa), the target vehicle body inclination angle $\theta_1^*$, and the riding section target position $\lambda_S^*$, given by Formulas (1) to (6).

If the vehicle target acceleration $\alpha^*$ falls within a range of the threshold value $\pm\alpha_{Max}(-\alpha_{Max} \leq \alpha^* \leq \alpha_{Max})$, the target vehicle body inclination angle $\theta_1^*$ is determined using Formula (2) and the riding section target position $\lambda_S^*$ is determined using Formula (5).

As a result, in the range of $(-\alpha_{Max} \leq \alpha^* \leq \alpha_{Max})$, the rider can feel an appropriate acceleration while maintaining the balance of the vehicle body by moving the riding section to $\lambda_S^*$ with the vehicle body inclined at $\theta_1^*$.

As such, movement of a gravity center position required for achieving the vehicle target acceleration $\alpha^*$ is accomplished in the range of the threshold value $\pm\alpha_{Max}$ by both inclination of the vehicle body and movement of the riding section. Herein, the amounts of movement of the gravity center borne by the inclination of the vehicle body and movement of the riding section are determined by a rider acceleration sensation coefficient $C_{Sense}$ in Formulas (2) and (5). The value of $C_{Sense}$ is preset to fall within a range of $0 \leq C_{Sense} \leq 1$.

A greater preset value $C_{Sense}$ relative to the vehicle target acceleration $\alpha^*$ results in a larger target vehicle body inclination angle $\theta_1^*$ (Formula 2) and a smaller riding section target position $\lambda_S^*$ (Formula 5).

$C_{Sense}$ corresponds to the degree of acceleration the rider feels. Specifically, if $C_{Sense}=1$, the target vehicle body inclination angle $\theta_1^*=0$ (Formula 2), so that the vehicle body is not inclined at all. The rider therefore directly feels inertial force as a result of acceleration or deceleration of the vehicle.

If $C_{Sense}=0$, $\theta_1^* = \phi^* = \tan^{-1} \alpha^*$, so that the vehicle body is inclined to an equilibrium inclination angle (angle between the resultant force of gravity and inertial force). As a result, the rider feels no inertial force (though the downward force increases relative to the rider).

In this embodiment, $C_{Sense}=p$ is preset as a value that makes the rider feel an optimum acceleration.

For example, if $C_{Sense}=1$, the movement of the gravity center position required for achieving the vehicle target acceleration $\alpha^*$ is accomplished by only the movement of the riding section 13, and the vehicle runs with the vehicle body controlled to maintain an upstanding position.

When the riding section movement amount reaches the stroke limit $\pm\lambda_{S,Max}$, specifically, if the vehicle target acceleration is $\alpha^* < -\alpha_{Max}$ or $\alpha^* > \alpha_{Max}$, the balance is maintained by further inclining the vehicle body as shown in FIG. 5 (Formulas 1 and 3).

Note that, if the riding section movement amount has not reached the stroke limit, the vehicle body inclination angle may be limited instead.

(Modified Example of Determination of the Target Vehicle Body Inclination Angle $\theta_1^*$ and the Riding Section Target Position $\lambda_S^*$)

In the above embodiment, a case was described in which the target vehicle body inclination angle $\theta_1^*$ and the riding section target position $\lambda_S^*$ are determined by selecting, from the relationship between the vehicle target acceleration $\alpha^*$ and the threshold value $\pm\alpha_{Max}$, any one of Formulas (1) to (3) and any one of Formulas (4) to (6).

Figure 6:
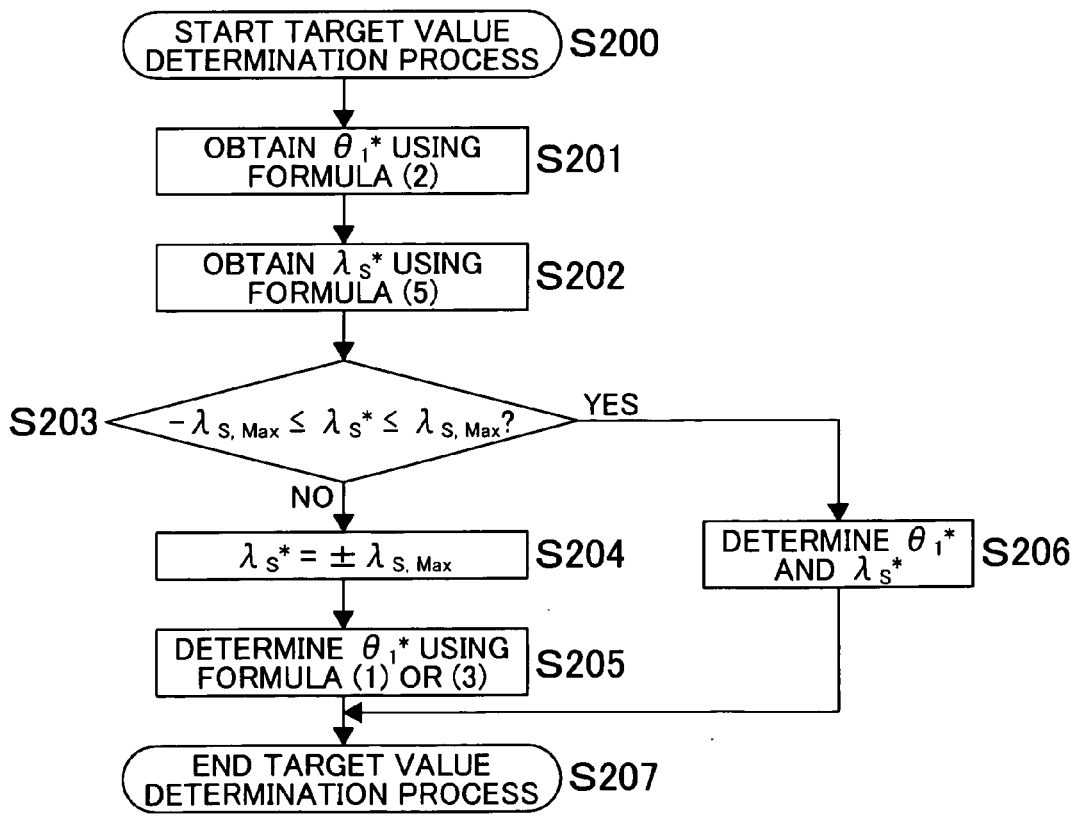
FIG. 6 is a flowchart of a target value determination process in a modification of the vehicle control device according to the embodiment of the present invention.

The target vehicle body inclination angle $\theta_1^*$ and the riding section target position $\lambda_S^*$ may instead be determined through a target value determination process shown in FIG. 6.

FIG. 6 is a flowchart that shows the target value determination process. In FIG. 6, at step S201, the main control ECU 21 first calculates the target vehicle body inclination angle $\theta_1^*$ corresponding to the vehicle target acceleration $\alpha^*$ using Formula (2).

At step S202, using the determined $\theta_1^*$ and Formula (5), the main control ECU 21 calculates the riding section target position $\lambda_S^*$, and at step S203, determines whether the obtained $\lambda_S^*$ falls within the range of $-\lambda_{S,Max} \leq \lambda_S^* \leq \lambda_{S,Max}$ over which the riding section can move.

If the calculated value $\lambda_S^*$ falls within the range over which the riding section can move (step S203: Y), the main control ECU 21 determines $\theta_1^*$ obtained at step S201 to be the target vehicle body inclination angle and $\lambda_S^*$ obtained at step 11 to be the riding section target position, respectively (step S206), before terminating the process.

If the calculated value $\lambda_S^*$ falls outside the range over which the riding section can move (step S203: N), the main control ECU 21 determines the maximum riding section movement amount $\pm\lambda_{S,Max}$ to be the riding section target position $\lambda_S^*$ (step S204).

The main control ECU 21 again calculates $\theta_1^*$ that corresponds to the vehicle target acceleration $\alpha^*$ using Formula (1) or (3) and determines this to be the target vehicle body inclination angle $\theta_1^*$ (step S205), before terminating the process.

According to the target value determination process described above, the target vehicle body inclination angle $\theta_1^*$ and the riding section target position $\lambda_S^*$ can be determined without using the threshold value $\alpha_{Max}$ for determining which expression to use among Formulas (1) to (3) and Formulas (4) to (6).

In the present embodiment, Formulas (1) to (6) that are strictly theoretical expressions are used to determine the vehicle body target attitude. A simpler expression may be used instead. For example, linearized formulas of Formulas (1) to (6) may be used. Further, instead of using the expressions, a map may be prepared in advance representing a relationship between the vehicle target acceleration $\alpha^*$ and the vehicle body target attitude and the vehicle body target attitude may be determined using that map.

A more complicated relational expression may also be used. For example, a relational expression may be established, with which: if an absolute value of the vehicle target acceleration $\alpha^*$ is equal to or smaller than a predetermined threshold value, the riding section is moved without inclining the vehicle body at all; and inclination of the vehicle body starts as the absolute value exceeds the predetermined threshold.

Note that, in the present embodiment, the maximum forward movement amount of the riding section from a reference position is equal to the maximum rearward movement amount of the riding section from the reference position. However, these movement amounts may be different from each other. For example, if the maximum rearward movement amount is greater than the maximum forward movement amount, braking performance can be improved over acceleration performance. In this case, a similar control as described above can be easily achieved by correcting the threshold value $\alpha_{Max}$ to correspond to each of the limit values.

Returning to the running and attitude control process (FIG. 4), at step S105, the main control ECU 21 uses each of the determined target values to calculate remaining target values.

Specifically, each target value is differentiated with respect to time or integrated with respect to time to calculate a drive wheel rotation angle target value $\theta W^*$, a vehicle body inclination angular velocity target value $[\theta_1^*]$, and a riding section movement speed target value $[\lambda_S^*]$.

Next, at step S106, the feedforward output of each actuator is determined.

The main control ECU 21 uses the following Formula (7) to determine a feedforward output $\tau_{W,FF}$ that is estimated to be required for achieving the vehicle target acceleration $\alpha^*$. Note that, $M\sim$ in Formula (7) represents a gross mass of the vehicle in which a rotational inertia component of the drive wheel is also incorporated.

Additionally, Formula (8) is used to determine a feedforward output $S_{S,FF}$ of the riding section motor 62 from each of the target values. $S_{S,FF}$ corresponds to the riding section thrust force required to prevent the riding section from being moved by gravity so as to stay at the target position at the target vehicle body inclination angle $\theta_1^*$.

[Expression 1]

$$\tau_{W,FF} = M\sim R_W g \alpha^* \qquad \text{(Formula 7)}$$

$$S_{SS,FF} = -m_S g \sin\theta_1^* \qquad \text{(Formula 8)}$$

where, $$M = m_1 + m_W$$

$$M\sim = M + I_W/R_W^2. \qquad \text{[Expression 2]}$$

Each state quantity can be more accurately controlled by applying the feedforward outputs obtained by Formulas (7) and (8).

Note that this method is particularly effective in decreasing steady-state deviation of the state quantity. However, an integral gain may be given in a feedback control (step S109) instead.

At step S107, the main control ECU 21 next acquires each state quantity from each sensor. Specifically, the drive wheel rotation angle (rotation angular velocity) is acquired from the drive wheel sensor 51, the vehicle body inclination angle (inclination angular velocity) is acquired from the vehicle body inclination sensor 41, and the riding section position (movement speed) is acquired from the riding section sensor 61.

Additionally, at step S108, the main control ECU 21 calculates remaining state quantities. Specifically, the drive wheel rotation angle (rotation angular velocity), the vehicle body inclination angle (inclination angular velocity), and the riding section position (movement speed) are integrated or differentiated with respect to time to calculate the remaining state quantities.

At step S109, the main control ECU 21 then determines a feedback output of each actuator.

Specifically, Formula (9) is used to determine a feedback output $\tau_{W,FB}$ of the drive motor 52 and Formula (10) is used to determine a feedback output $S_{S,FB}$ of the riding section motor 62, based on a deviation between each target value and actual state quantity.

In Formulas (9) and (10), each K value is a feedback gain and, for example, an optimum regulator value is preset for each feedback gain K. In addition, an integral gain may be introduced to eliminate the steady-state deviation as described earlier.

$$\tau_{W,FB} = -K_{W1}(\theta_W - \theta_W^*) - K_{W2}([\theta_W] - [\theta_W^*]) - K_{W3}(\theta_1 - \theta_1^*) - K_{W4}([\theta_1] - [\theta_1^*]) - K_{W5}(\lambda_S - \lambda_S^*) - K_{W6}([\lambda_S] - [\lambda_S^*]) \qquad \text{(Formula 9)}$$

$$S_{S,FB} = -K_{S1}(\theta_W - \theta_W^*) - K_{S2}([\theta_W] - [\theta_W^*]) - K_{S3}(\theta_1 - \theta_1^*) - K_{S4}([\theta_1] - [\theta_1^*]) - K_{S5}(\lambda_S - \lambda_S^*) - K_{S6}([\lambda_S] - [\lambda_S^*]) \qquad \text{(Formula 10)}$$

Some of the feedback gains may be zeroed to simplify the expressions. For example, $\tau_{W,FB}=-K_{W2}([\theta_W]-[\theta_W^*])-K_{W3}(\theta_1-\theta_1^*)$ may be used in place of Formula (9) and $S_{S,FB}=-K_{S5}(\lambda_S-\lambda_S^*)$ may be used in place of Formula (10).

Finally, at step S110, the main control ECU 21 gives each element control system a command value, and returns to a main routine.

Specifically, the main control ECU 21 supplies the drive wheel control ECU 22 with a sum $(\tau_{W,FF}+\tau_{W,FB})$ of the feedforward output $\tau_{W,FF}$ determined at step S106 and the feedback output $\tau_{W,FB}$ determined at step S109 as a drive torque command value $\tau_W$. Further, the main control ECU 21 supplies the riding section control ECU 23 with a sum $(S_{S,FF}+S_{S,FB})$ of the feedforward output $S_S$ FF and the feedback output $S_{S,FB}$ as a riding section thrust force command value $S_S$.

Accordingly, the drive wheel control ECU 22 supplies the drive motor 52 with an input voltage (drive voltage) corresponding to the drive torque command value $\tau_W$ to thereby apply the drive wheel drive torque $\tau_W$.

Similarly, the riding section control ECU 23 supplies the riding section motor 62 with an input voltage (drive voltage) corresponding to the riding section thrust force command value $S_S$ to thereby move the riding section.

Figure 7:
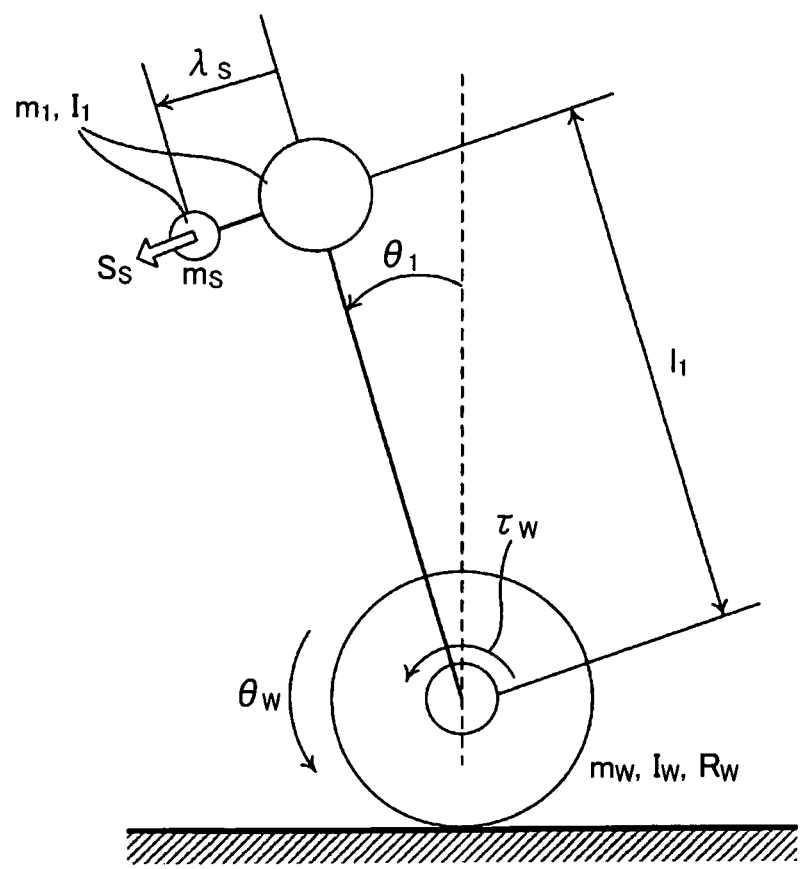
FIG. 7 is a drawing that shows a dynamic model of a vehicle attitude control system.

The parameters of the vehicle attitude control are organized below. FIG. 7 is a drawing that shows a dynamic model of a vehicle attitude control system.

(a) State quantities $\theta_W$: Drive wheel rotation angle [rad]

$\theta_1$: Vehicle body inclination angle (with reference to the vertical axis) [rad]

$\lambda_S$: Riding section position (with reference to the vehicle body central point) [m]

(b) Inputs $\tau_W$: Drive torque (total of two wheels) [Nm]

$S_S$: Riding section thrust force [N]

(c) Physical constants g: Gravitational acceleration [m/s²]

(d) Parameters $m_W$: Drive wheel mass (total of two wheels) [kg]

$R_W$: Drive wheel ground contact radius [m]

$I_W$: Drive wheel inertia moment (total of two wheels) [kgm²]

$D_W$: Viscous damping coefficient relative to drive wheel rotation [Ns/rad]

$m_1$: Vehicle body mass (including riding section) [kg]

$l_1$: Vehicle body gravity center distance (from axle) [m]

$I_1$: Vehicle body inertia moment (about gravity center) [kgm²]

$D_1$: Viscous damping coefficient relative to vehicle body inclination [Ns/rad]

$m_S$: Riding section mass [kg]

$l_S$: Riding section reference gravity center distance (from axle) [m]

$I_S$: Riding section inertia moment (about gravity center) [kgm²]

$D_S$: Viscous damping coefficient relative to riding section translation [Ns/m]

Figure 8:
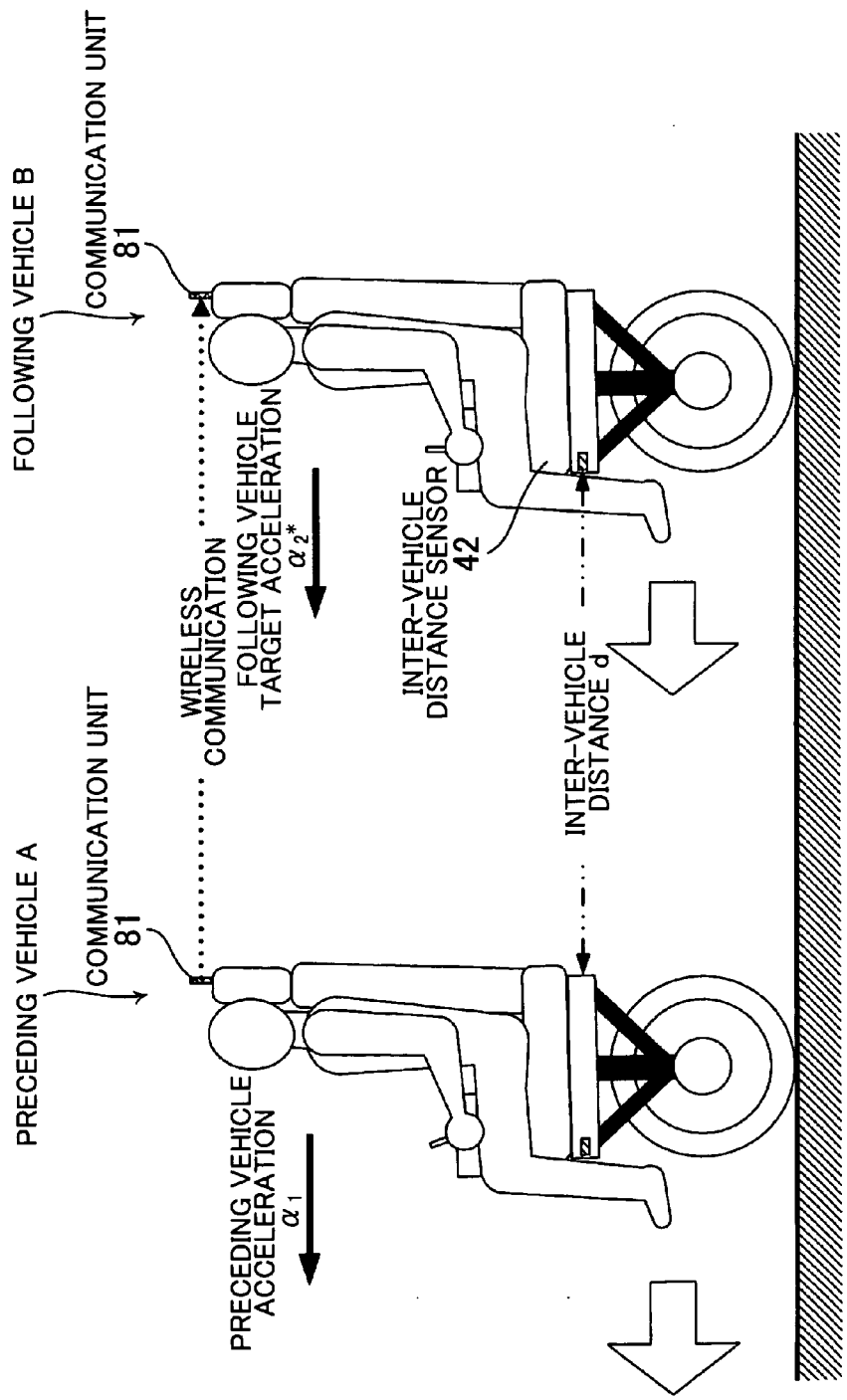
FIG. 8 is a drawing that shows a control model in the vehicle control device according to the embodiment of the present invention.

The entire vehicle control process of the follow-up running mode will be outlined next. FIG. 8 is a drawing that shows a control model in the vehicle control device according to the embodiment of the present invention, and FIG. 9 shows block diagrams of a control system in the follow-up running mode of the vehicle control device according to the embodiment of the present invention.

In the present embodiment, a case is described in which both the preceding vehicle and the following vehicle are inverted pendulum vehicles. However, the control of the vehicle control device according to the present invention may also be applied to a case in which the following vehicle is an ordinary four-wheel vehicle or the like provided that the preceding vehicle is an inverted pendulum vehicle.

Hereinafter, a vehicle control in which a following vehicle B running in the follow-up running mode follows a preceding vehicle A running in the normal running mode, as shown in FIG. 8, will be described. FIG. 8 assumes a condition in which the preceding vehicle A is driven and operated by a rider, and the following vehicle B automatically follows (without being driven or operated) the preceding vehicle A in the follow-up running mode.

It is an object of the vehicle control device of the present embodiment to determine a target acceleration command value of the target acceleration $\alpha_2^*$ in the follow-up running mode.

Figure 9A:
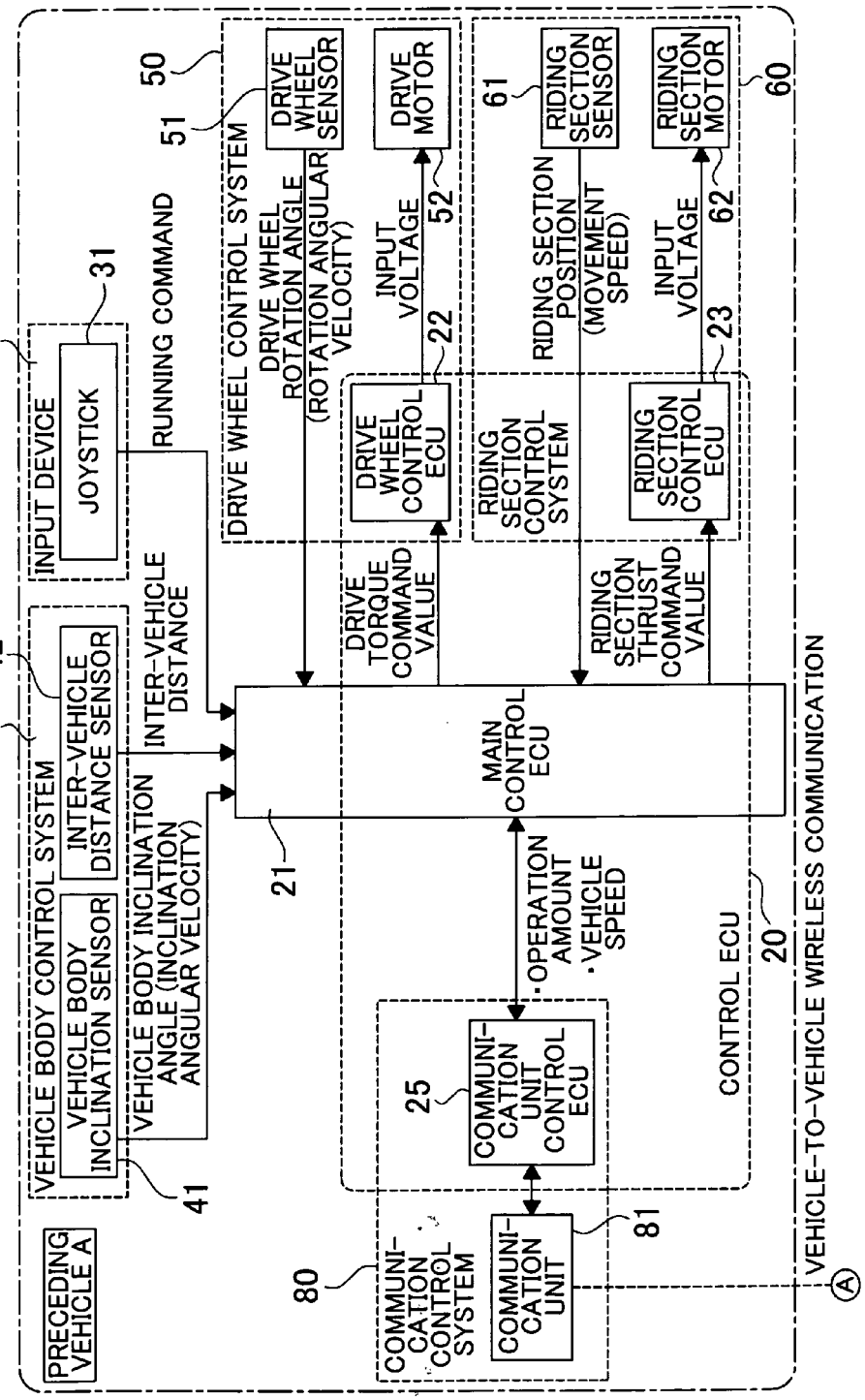
FIGS. 9A and 9B show block diagrams of a control system in a follow-up running mode of the vehicle control device according to the embodiment of the present invention.
Figure 9B:
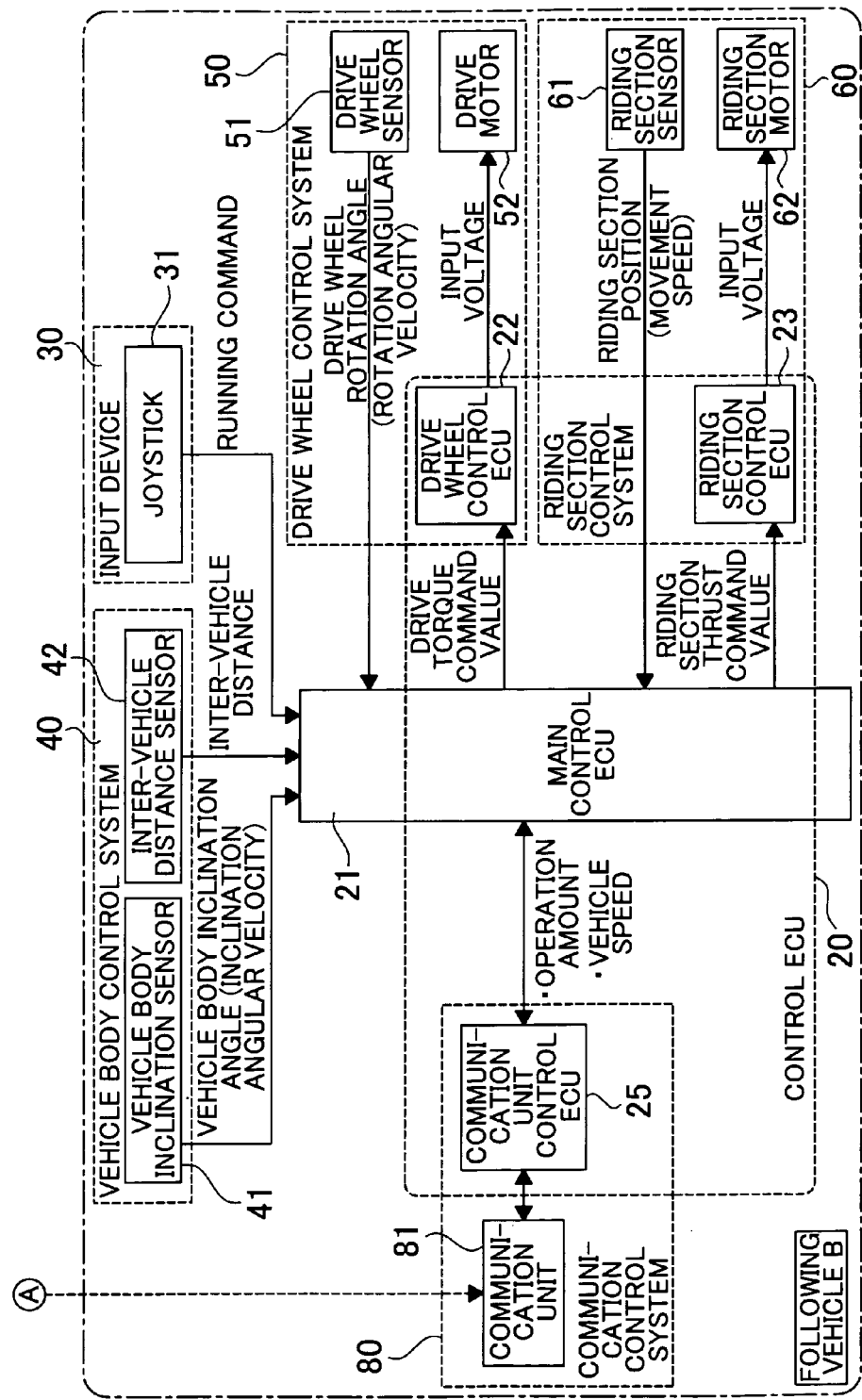

The control system block diagram in FIG. 9A represents that of the preceding vehicle A and the control system block diagram in FIG. 9B represents that of the following vehicle B. Note that the control system block diagrams shown in FIG. 9 are based on the control system block diagram shown in FIG. 3.

In the follow-up running mode, the following vehicle B acquires running condition data of the preceding vehicle A through the communication unit 81 from the preceding vehicle A. More specifically, vehicle speed information of the preceding vehicle A and the operation amount of the joystick 31 of the preceding vehicle A are acquired as running condition data. In addition, the following vehicle B acquires an inter-vehicle distance d according to the measurement of the inter-vehicle distance sensor 42.

In the present embodiment, the target acceleration is computed based on the running condition data (vehicle speed and joystick operation amount) of the preceding vehicle A acquired through the communication unit 81 and the inter-vehicle distance d measured by the inter-vehicle distance sensor 42. Therefore, the following vehicle B can track the preceding vehicle A without delay and a highly accurate automatic follow-up running control can be realized.

Note that the vehicle speed here is obtained using a wheel rotation angle. Specifically, the wheel rotation angle is detected and a differential value of the wheel rotation angle is used as the wheel rotational speed. The vehicle speed is then obtained from this rotational speed.

After acquiring the above parameters, the main control ECU 21 of the following vehicle B calculates two acceleration command values as candidates for the command value of the target acceleration, based on Formula (11) for calculating a first acceleration command value and Formula (12) for calculating a second acceleration command value. $\alpha_2$ is an acceleration command value calculated using the first acceleration command value, and $\alpha_2'$ is an acceleration command value calculated using the second acceleration command value.

$$\alpha_2=\alpha_1+k_1(d-d^*)+k_2(v_1-v_2) \qquad \text{(Formula 11)}$$

$$\alpha_2'=k_3\cdot J_1 \qquad \text{(Formula 12)}$$

In Formulas (11) and (12), $\alpha_1$ is the acceleration of the preceding vehicle A, $k_1$ is the inter-vehicle distance gain, d is the inter-vehicle distance measured by the inter-vehicle distance sensor 42, d* is the target inter-vehicle distance, $k_2$ is the speed gain, $v_1$ is the vehicle speed of the preceding vehicle A, $v_2$ is the vehicle speed of the following vehicle B, $k_3$ is the operation amount gain, and $J_1$ is the joystick operation amount of the preceding vehicle A.

The main control ECU 21 calculates both of the two acceleration command values $\alpha_2$ and $\alpha_2'$, and performs a control so as to utilize the appropriate value among these acceleration command values depending on the estimated behavior of the preceding vehicle A.

More specifically, if the preceding vehicle A is "accelerating", it is determined based on the joystick operation amount of the preceding vehicle A whether such "accelerating" is a normal acceleration or an acceleration as a counter operation in preparation for braking. Depending on this determination, the appropriate acceleration command value from among the two acceleration commands $\alpha_2$ and $\alpha_2'$ is utilized as the acceleration command value $\alpha_2^*$ of the target acceleration.

Thus, the following vehicle B determines the acceleration command value $\alpha_2^*$ depending on the joystick operation amount information of the preceding vehicle A. Therefore, no delay occurs in the automatic follow-up running control of the following vehicle B, and the accuracy of the automatic follow-up running control can be improved. Conversely, by configuring the control such that the joystick operation amount of the preceding vehicle A is not used except at times of deceleration, the following vehicle B is not affected by minute adjustment operations performed by the driver of the preceding vehicle and can travel in a stable manner.

When the preceding vehicle A brakes, the joystick operation amount is transmitted from the preceding vehicle A to the following vehicle B so that information regarding the preceding vehicle A braking can be transmitted without delay to the following vehicle B to help avoid the risk of collision.

As described above, in the present embodiment, the vehicle speed information of the preceding vehicle A and the operation amount of the joystick 31 of the preceding vehicle A are communicated from the preceding vehicle A to the following vehicle B as running condition data. Thus, the accuracy of the automatic follow-up running control can be improved.

Figure 10:
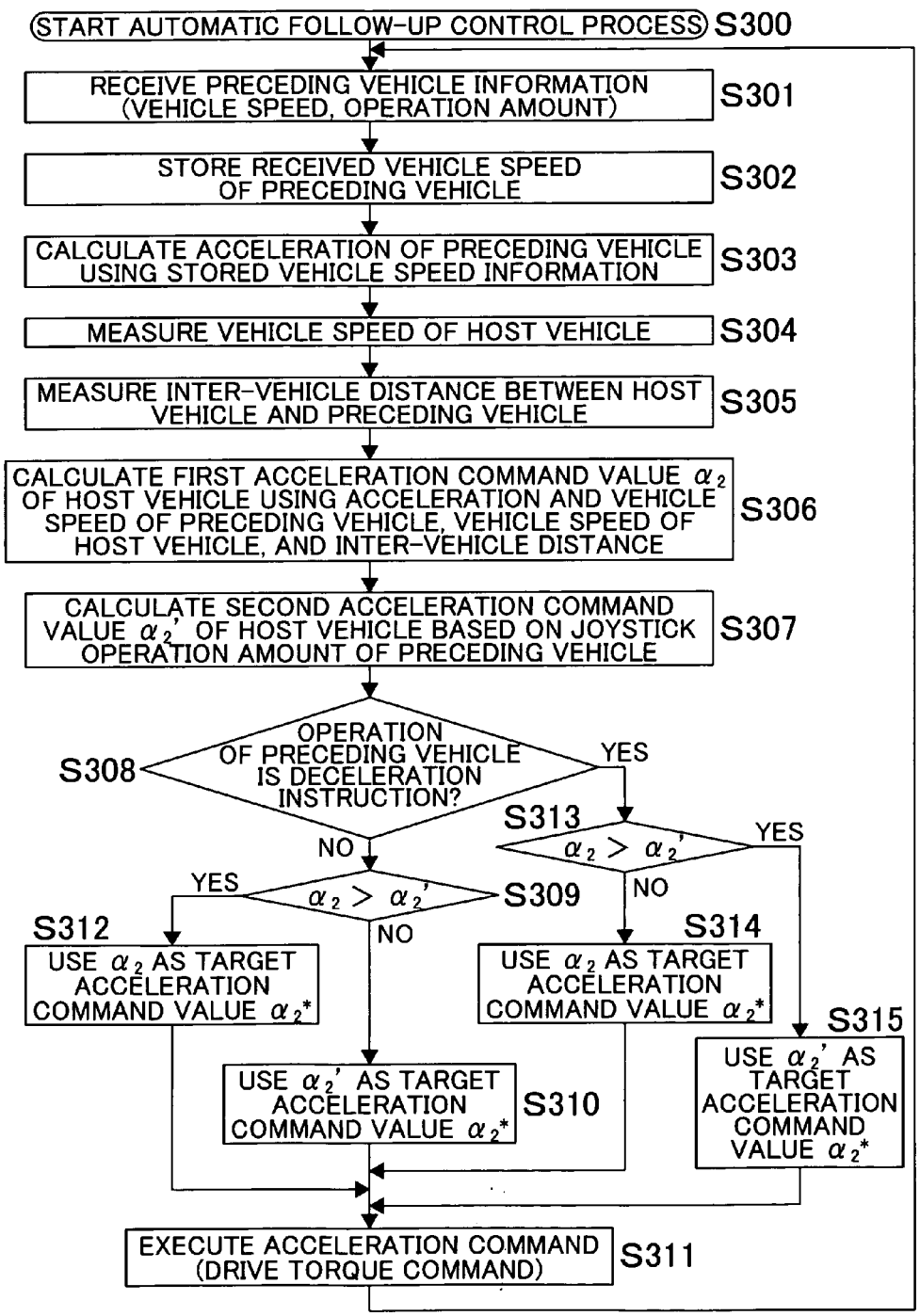
FIG. 10 is a flowchart of an automatic follow-up control process in the vehicle control device according to the embodiment of the present invention.

The control process of the follow-up running mode in the following vehicle B will be described next. FIG. 10 is a flowchart of the automatic follow-up control process in the vehicle control device according to the embodiment of the present invention.

Once the automatic follow-up control process is initiated at step S300 in FIG. 10, the process proceeds to step S301 where the communication unit 81 is used to receive the vehicle speed information and the joystick 31 operation amount of the preceding vehicle A (running condition data).

At step S302, the received vehicle speed of the preceding vehicle A is stored in a storage portion (not shown) of the main control ECU 21. At step S303, the main control ECU 21 calculates the acceleration of the preceding vehicle A from information regarding the vehicle speed that is cumulatively stored in the storage portion.

At step S304, the vehicle speed of the host vehicle (following vehicle B) is measured by the drive wheel sensor 51. Next, at step S305, the inter-vehicle distance d between the host vehicle (following vehicle B) and the preceding vehicle A is measured by the inter-vehicle distance sensor 42.

At step S306, the first acceleration command value $\alpha_2$ of the host vehicle is calculated using Formula (11) from the acceleration $\alpha_1$ and the vehicle speed $v_1$ of the preceding vehicle A, the vehicle speed $v_2$ of the host vehicle, and the inter-vehicle distance d. At step S307, the second acceleration command value $\alpha_2'$ of the host vehicle is calculated using Formula (12) based on the joystick operation amount $J_1$ of the preceding vehicle A.

At step S308, it is determined whether the operation of the preceding vehicle A is a deceleration command based on the joystick operation amount $J_1$, of the preceding vehicle A. If the determination result at step S308 is YES, the process proceeds to step S313; if the determination result at step S308 is NO, the process proceeds to step S309.

At step S313, it is determined whether $\alpha_2 > \alpha_2'$. If the determination at step S313 is YES, the process proceeds to step S315 where the smaller value $\alpha_2'$ among the first acceleration command value $\alpha_2$ and the second acceleration command value $\alpha_2'$ is utilized as the target acceleration command value $\alpha_2^*$. If the determination at step S313 is NO, the process proceeds to step S314 where the smaller value $\alpha_2$ among the first acceleration command value $\alpha_2$ and the second acceleration command value $\alpha_2'$ is utilized as the target acceleration command value $\alpha_2^*$. At step S311, the drive torque command is executed based on the utilized acceleration command value. Following step S311, the process returns to step S301 and loops again. Note that this flowchart assumes looping of the process until the follow-up running mode is canceled.

At step S309, it is determined whether $\alpha_2 > \alpha_2'$. If the determination at step S309 is YES, the process proceeds to step S312 where the larger value $\alpha_2$ among the first acceleration command value $\alpha_2$ and the second acceleration command value $\alpha_2'$ is utilized as the target acceleration command value $\alpha_2^*$. If the determination at step S309 is NO, the process proceeds to step S310 where the larger value $\alpha_2'$ among the first acceleration command value $\alpha_2$ and the second acceleration command value $\alpha_2'$ is utilized as the target acceleration command value $\alpha_2^*$. At step S311, the drive torque command is executed based on the utilized acceleration command value. Following step S311, the process returns to step S301 and loops again. Note that this flowchart assumes looping of the process until the follow-up running mode is canceled.

The determination at step S308 serves as material for enabling the following vehicle B to distinguish between whether the acceleration operation of the preceding vehicle A is a normal acceleration operation or an acceleration operation (counter operation) in preparation for braking.

If the determination result at step S308 is YES, the preceding vehicle A is attempting to brake, and therefore the smaller value among the first acceleration command value $\alpha_2$ and the second acceleration command value $\alpha_2'$ is utilized as the acceleration command value $\alpha_2^*$ of the target acceleration. Thus, the following vehicle B can avoid a situation that may lead to a collision with the preceding vehicle A.

If the determination result at step S308 is NO, the preceding vehicle A is attempting to accelerate, and therefore the larger value among the first acceleration command value $\alpha_2$ and the second acceleration command value $\alpha_2'$ is utilized as the acceleration command value $\alpha_2^*$ of the target acceleration. Thus, the following vehicle B can track the preceding vehicle A without delay.

According to the present invention, the vehicle speed information of the preceding vehicle A and the joystick 31 operation amount of the preceding vehicle A is communicated from the preceding vehicle A to the following vehicle B as running condition data, which can improve the accuracy of the automatic follow-up running control.

Although an example was described with the present embodiment in which a vehicle follows a preceding vehicle, the same control can be achieved when a vehicle travels side by side with the preceding vehicle.

A second embodiment of the present invention will be described next. In the previous embodiment, while in the follow-up running mode, the following vehicle B uses the communication unit 81 to acquire the vehicle speed information of the preceding vehicle A and the joystick 31 operation amount of the preceding vehicle A. However, in the present embodiment, the following vehicle B uses the communication unit 81 to acquire the vehicle speed information of the preceding vehicle A and an acceleration command value $\alpha_{T1}$ of the preceding vehicle A. Note that in the present embodiment as well, the following vehicle B acquires the inter-vehicle distance d measured by the inter-vehicle distance sensor 42.

According to the present embodiment, after acquiring the above parameters, the main control ECU 21 of the following vehicle B calculates two acceleration command values as candidates for the command value of the target acceleration, based on Formula (11) for calculating a first acceleration command value, which is the same as that used in the previous embodiment, and Formula (13) for calculating a second acceleration command value, which is unique to the present embodiment. Here, $\alpha_2$ is an acceleration command value calculated using the first acceleration command value, and $\alpha_{2a}'$ is an acceleration command value calculated using the second acceleration command value.

In this other embodiment as described above, the target acceleration is computed based on the running condition data (vehicle speed and acceleration command value) of the preceding vehicle A acquired through the communication unit 81 and the inter-vehicle distance d measured by the inter-vehicle distance sensor 42. Therefore, the following vehicle B can track the preceding vehicle A without delay and a highly accurate automatic follow-up running control can be realized.

Note that the vehicle speed here is obtained using a wheel rotation angle. Specifically, the wheel rotation angle is detected and a differential value of the wheel rotation angle is used as the wheel rotational speed. The vehicle speed is then obtained from this rotational speed.

According to the present embodiment, after acquiring the above parameters, the main control ECU 21 of the following vehicle B calculates two acceleration command values as candidates for the command value of the target acceleration, based on Formula (11) for calculating a first acceleration command value, which is the same as that used in the previous embodiment, and Formula (13) for calculating a second acceleration command value, which is unique to the present embodiment. Here, $\alpha_2$ is an acceleration command value calculated using the first acceleration command value, and $\alpha_{2a}'$ is an acceleration command value calculated using the second acceleration command value.

$$\alpha_2 = \alpha_1 + k_1(d-d^*) + k_2(v_1-v_2) \quad \text{(Formula 11)}$$

$$\alpha_{2a}' = k_1(d-d^*) + k_2(v_1-v_2) + k_4 \cdot \alpha_{T1} \quad \text{(Formula 13)}$$

In Formulas (11) and (13), $\alpha_1$ is the acceleration of the preceding vehicle A, $k_1$ is the inter-vehicle distance gain, d is the inter-vehicle distance measured by the inter-vehicle distance sensor 42, d* is the target inter-vehicle distance, $k_2$ is the speed gain, $v_1$ is the vehicle speed of the preceding vehicle A, $v_2$ is the vehicle speed of the following vehicle B, and $\alpha_{T1}$ is the acquired acceleration command value of the preceding vehicle A.

$k_4$ is the acceleration command value gain, and $k_4 \geq 1$. $k_4$ is defined as the margin for surely stopping the vehicle. Although $k_4$ may be set to 1 in theory, $k_4$ is a gain used for ensuring safety in actuality.

The main control ECU 21 calculates both of the two acceleration command values $\alpha_2$ and $\alpha_{2a}'$, and performs a control so as to utilize the appropriate value among these acceleration command values depending on the estimated behavior of the preceding vehicle A.

More specifically, if the preceding vehicle A is "accelerating", it is determined based on the acceleration command value $\alpha_{T1}$ calculated within the main control ECU 21 whether such "accelerating" is a normal acceleration or an acceleration as a counter operation in preparation for braking. Depending on this determination, the appropriate acceleration command value from among the two acceleration commands $\alpha_2$ and $\alpha_{2a}'$ is utilized as the acceleration command value $\alpha_2^*$ of the target acceleration.

Thus, the following vehicle B determines the acceleration command value $\alpha_2^*$ depending on the acceleration command value of the preceding vehicle A. Therefore, no delay occurs in the automatic follow-up running control of the following vehicle B, and the accuracy of the automatic follow-up running control can be improved. Conversely, by configuring the control such that the acceleration command value information of the preceding vehicle A is not used except at times of deceleration, the following vehicle B is not affected by minute adjustment operations performed by the driver of the preceding vehicle and can travel in a stable manner.

When the preceding vehicle A brakes, the acceleration command value is transmitted from the preceding vehicle A to the following vehicle B so that information regarding the preceding vehicle A braking can be transmitted without delay to the following vehicle B to help avoid the risk of collision.

As described above, in the present embodiment, the vehicle speed information of the preceding vehicle A and the acceleration command value of the preceding vehicle A are communicated from the preceding vehicle A to the following vehicle B as running condition data. Thus, the accuracy of the automatic follow-up running control and riding comfort can be improved.

Figure 11:
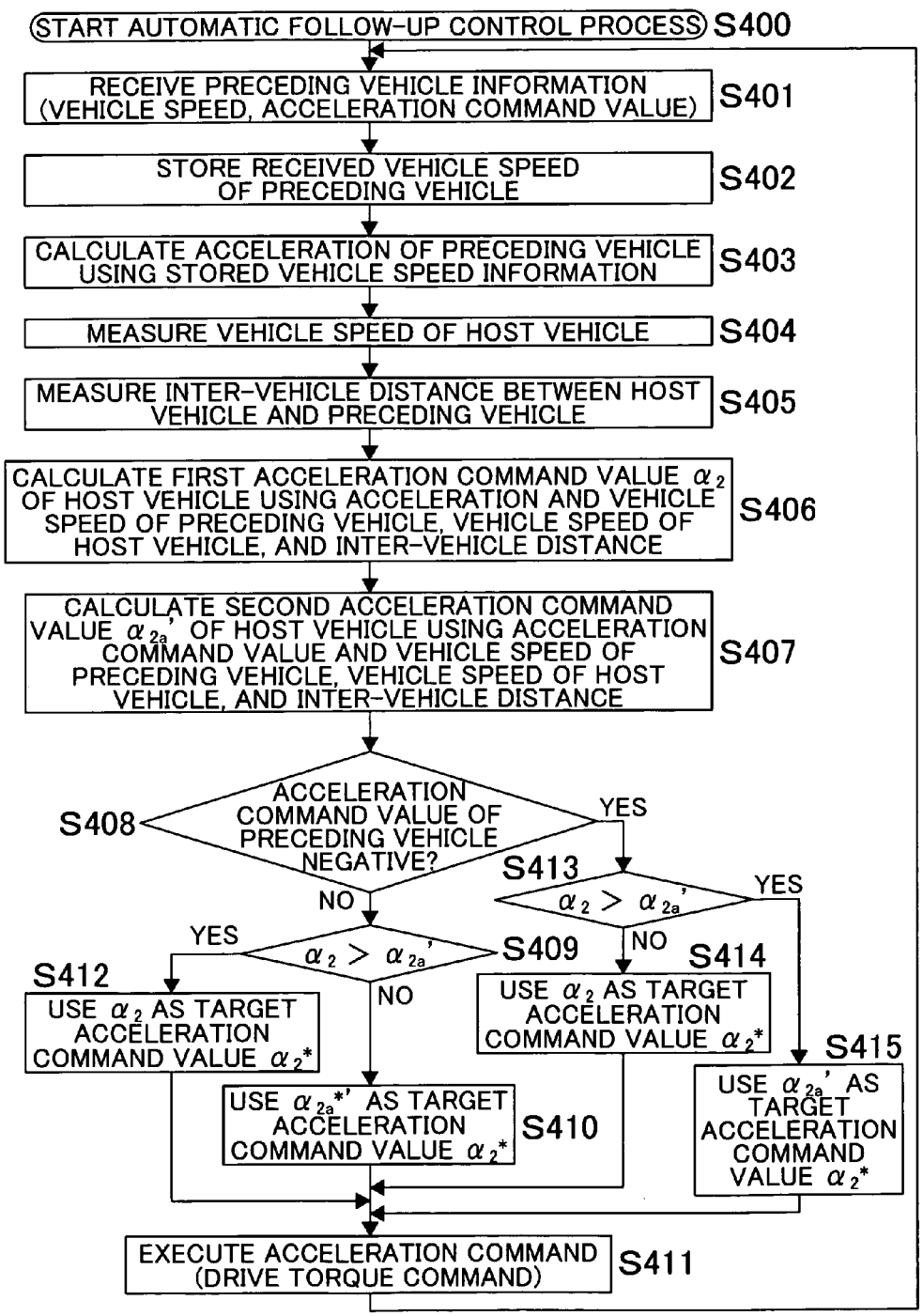
FIG. 11 is a flowchart of an automatic follow-up control process in the vehicle control device according to a second embodiment of the present invention.

The control process of the follow-up running mode in the following vehicle B will be described next. FIG. 11 is a flowchart of an automatic follow-up control process in the vehicle control device according to a second embodiment of the present invention. Once the automatic follow-up control process is initiated at step S400 in FIG. 11, the process proceeds to step S401 where the communication unit 81 is used to receive the vehicle speed information and the acceleration command value $\alpha_{T1}$ of the preceding vehicle A (running condition data).

At step S402, the received vehicle speed of the preceding vehicle A is stored in the storage portion (not shown) of the main control ECU 21. At step S403, the main control ECU 21 calculates the acceleration of the preceding vehicle A from information regarding the vehicle speed that is cumulatively stored in the storage portion.

At step S404, the vehicle speed of the host vehicle (following vehicle B) is measured by the drive wheel sensor 51. Next, at step S405, the inter-vehicle distance d between the host vehicle (following vehicle B) and the preceding vehicle A is measured by the inter-vehicle distance sensor 42.

At step S406, the first acceleration command value $\alpha_2$ of the host vehicle is calculated using Formula (11) from the acceleration $\alpha_1$ and the vehicle speed $v_1$ of the preceding vehicle A, the vehicle speed $v_2$ of the host vehicle, and the inter-vehicle distance d. At step S407, the second acceleration command value $\alpha_{2a}'$ of the host vehicle is calculated using Formula (13) based on the vehicle speed $v_1$, the vehicle speed $v_2$ of the host vehicle, the inter-vehicle distance d, and the acceleration command value $\alpha_{T1}$ of the preceding vehicle A.

At step S408, it is determined whether the acceleration command value of the preceding vehicle A is negative (deceleration) based on the acceleration command value $\alpha_{T1}$ of the preceding vehicle A. If the determination result at step S408 is YES, the process proceeds to step S413; if the determination result at step S408 is NO, the process proceeds to step S409.

At step S413, it is determined whether $\alpha_2 > \alpha_{2a}'$. If the determination at step S413 is YES, the process proceeds to step S415 where the smaller value $\alpha_{2a}'$ among the first acceleration command value $\alpha_2$ and the second acceleration command value $\alpha_{2a}'$ is utilized as the target acceleration command value $\alpha_2^*$. If the determination at step S413 is NO, the process proceeds to step S414 where the smaller value $\alpha_2$ among the first acceleration command value $\alpha_2$ and the second acceleration command value $\alpha_{2a}'$ is utilized as the target acceleration command value $\alpha_2^*$. At step S411, the drive torque command is executed based on the utilized acceleration command value. Following step S411, the process returns to step S401 and loops again. Note that this flowchart assumes looping of the process until the follow-up running mode is canceled.

At step S409, it is determined whether $\alpha_2 > \alpha_{2a}'$. If the determination at step S409 is YES, the process proceeds to step S412 where the larger value $\alpha_2$ among the first acceleration command value $\alpha_2$ and the second acceleration command value $\alpha_{2a}'$ is utilized as the target acceleration command value $\alpha_2^*$. If the determination at step S409 is NO, the process proceeds to step S410 where the larger value $\alpha_{2a}'$ among the first acceleration command value $\alpha_2$ and the second acceleration command value $\alpha_{2a}'$ is utilized as the target acceleration command value $\alpha_2^*$. At step S411, the drive torque command is executed based on the utilized acceleration command value. Following step S411, the process returns to step S401 and loops again. Note that this flowchart assumes looping of the process until the follow-up running mode is canceled.

The determination at step S408 serves as material for enabling the following vehicle B to distinguish between whether the acceleration operation of the preceding vehicle A is a normal acceleration operation or an acceleration operation (counter operation) in preparation for braking.

If the determination result at step S408 is YES, the preceding vehicle A is attempting to brake, and therefore the smaller value among the first acceleration command value $\alpha_2$ and the second acceleration command value $\alpha_{2a}'$ is utilized as the acceleration command value $\alpha_2^*$ of the target acceleration. Thus, the following vehicle B can avoid a situation that may lead to a collision with the preceding vehicle A.

If the determination result at step S408 is NO, the preceding vehicle A is attempting to accelerate, and therefore the larger value among the first acceleration command value $\alpha_2$ and the second acceleration command value $\alpha_{2a}'$ is utilized as the acceleration command value $\alpha_2^*$ of the target acceleration. Thus, the following vehicle B can track the preceding vehicle A without delay.

According to the present invention, the vehicle speed information of the preceding vehicle A and the acceleration command value $\alpha_{T1}$ of the preceding vehicle A is communicated from the preceding vehicle A to the following vehicle B as running condition data, which can improve the accuracy of the automatic follow-up running control.

Although an example was described with the present embodiment in which a vehicle follows a preceding vehicle, the same control can be achieved when a vehicle travels side by side with the preceding vehicle.

A third embodiment of the present invention will be described next. In the present embodiment as well, the following vehicle B uses the communication unit 81 to acquire the vehicle speed information of the preceding vehicle A and the acceleration command value $\alpha_{T1}$ of the preceding vehicle A. The second acceleration command value $\alpha_{2a}'$ is obtained based on the acceleration command value $\alpha_{T1}$ acquired from the preceding vehicle A. In this case, the previous Formula (13) may be used as the formula for calculating the second acceleration command value.

In the second embodiment, the main control ECU 21 calculates both of the two acceleration command values $\alpha_2$ and $\alpha_{2a}'$ as the acceleration command value $\alpha_2^*$ of the following vehicle B, and a control is performed so as to utilize the appropriate value among these acceleration command values depending on the estimated behavior of the preceding vehicle A. In the present embodiment, a control is performed such that the second acceleration command value $\alpha_{2a}'$ is utilized as the acceleration command value $\alpha_2^*$ of the following vehicle B. Specifically, in the third embodiment, $\alpha_2^* = \alpha_{2a}'$. Thus, a control can be achieved without the determination of a deceleration command or the like.

Figure 12:
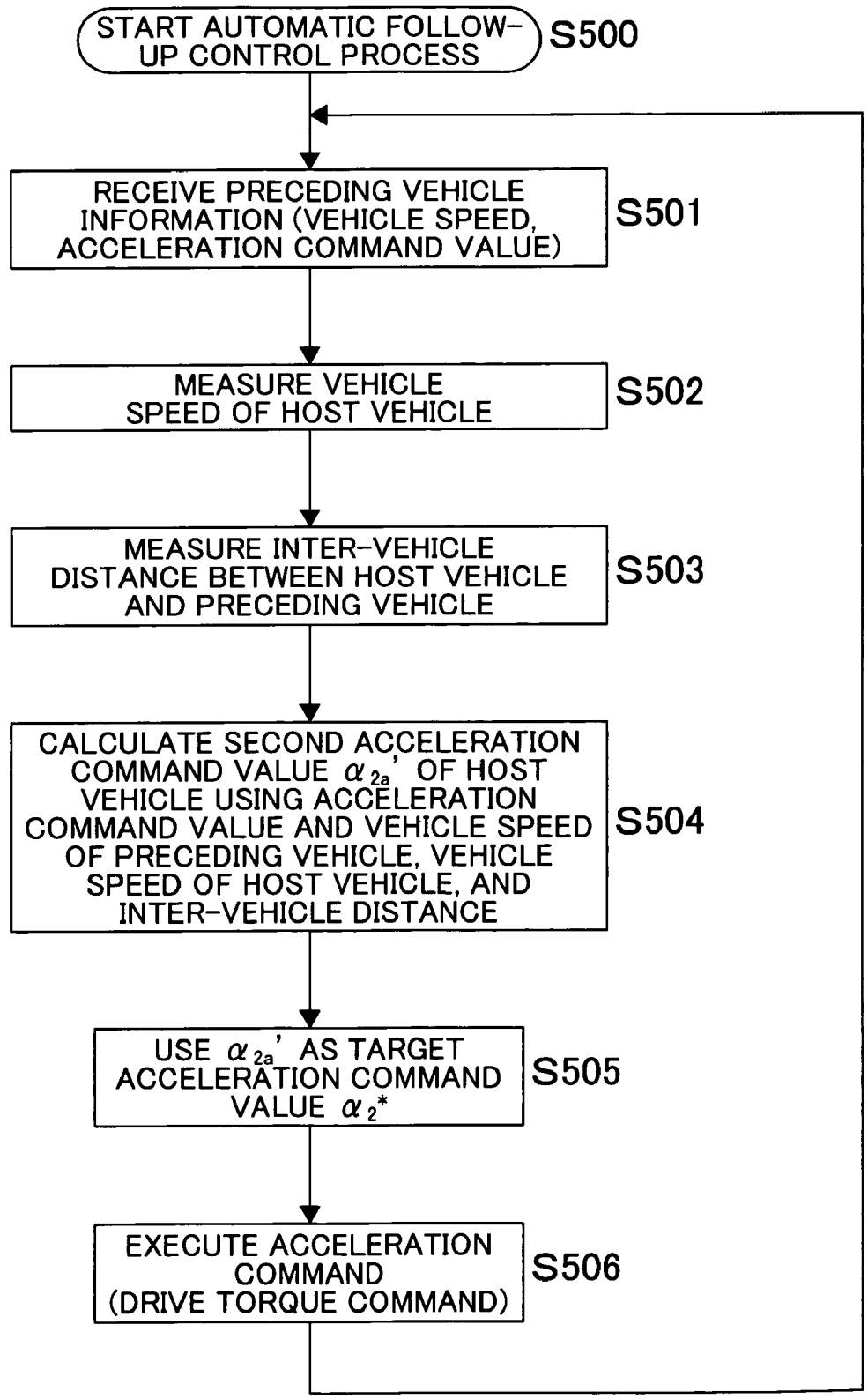
FIG. 12 is a flowchart of an automatic follow-up control process in the vehicle control device according to a third embodiment of the present invention.

The control process of the follow-up running mode in the following vehicle B according to the third embodiment will be described next. FIG. 12 is a flowchart of an automatic follow-up control process in the vehicle control device according to the third embodiment of the present invention. Once the automatic follow-up control process is initiated at step S500 in FIG. 12, the process proceeds to step S501 where the communication unit 81 is used to receive the vehicle speed information and the acceleration command value $\alpha_{T1}$ of the preceding vehicle A (running condition data).

At step S502, the vehicle speed of the host vehicle (following vehicle B) is measured by the drive wheel sensor 51. Next, at step S503, the inter-vehicle distance d between the host vehicle (following vehicle B) and the preceding vehicle A is measured by the inter-vehicle distance sensor 42.

At step S504, the second acceleration command value $\alpha_{2a}'$ of the host vehicle is calculated using Formula (13) based on the vehicle speed $v_1$, the vehicle speed $v_2$ of the host vehicle, the inter-vehicle distance d, and the acceleration command value $\alpha_{T1}$ of the preceding vehicle A.

At step S505, the second acceleration command value $\alpha_{2a}'$ is utilized as the target acceleration command value $\alpha_2^*$.

At step S506, the drive torque command is executed based on the utilized acceleration command value. Following step S506, the process returns to step S501 and loops again. Note that this flowchart assumes looping of the process until the follow-up running mode is canceled.

According to the present invention, by calculating only $\alpha_{2a}'$ to obtain the acceleration command value $\alpha_2^*$ of the following vehicle B and setting $\alpha_2^* = \alpha_{2a}'$, a control can be achieved without the determination of a deceleration command or the like, which is effective in cases that place particular importance on the follow-up capability of the following vehicle B with respect to the preceding vehicle A such as when follow-up is performed with a short inter-vehicle distance.

Although an example was described with the present embodiment in which a vehicle follows a preceding vehicle, the same control can be achieved when a vehicle travels side by side with the preceding vehicle.

INDUSTRIAL APPLICABILITY

According to the vehicle control device of the present invention, when automatic follow-up running is performed in a vehicle that utilizes an inverted pendulum attitude control, no delay occurs in the automatic follow-up running control of the following vehicle and information regarding braking is transmitted without delay to the following vehicle, which can help avoid the risk of collision and realize a highly accurate automatic follow-up running control. It is often more preferable for a plurality of vehicles to form a line and travel as a vehicle group from the standpoints of saving labor, mitigating traffic, and the like. Thus, a vehicle control such as that performed by the vehicle control device of the present invention has significant industrial applicability.

[FIG. 1]
1/ TRANSLATIONAL MOVEMENT OF RIDING SECTION
2/ GRAVITATIONAL FORCE
3/ INERTIAL FORCE
4/ ANTI-TORQUE
5/ (a) WHEN RIDING SECTION IS MOVED
6/ (b) WHEN RIDING SECTION IS NOT MOVED

[FIG. 2]
12/ DRIVE MOTOR
42/ INTER-VEHICLE DISTANCE SENSOR
30/ INPUT DEVICE
31/ JOYSTICK
133/ HEADREST
81/ COMMUNICATION UNIT
13 RIDING SECTION
132/ BACK REST PORTION
131/ SEAT CUSHION PORTION
63/ MOVEMENT MECHANISM
16/ CONTROL UNIT
14/ SUPPORT MEMBER
11a, 11b/ DRIVE WHEEL

[FIG. 3]
40/ VEHICLE BODY CONTROL SYSTEM
41/ VEHICLE BODY INCLINATION SENSOR
42/ INTER-VEHICLE DISTANCE SENSOR
30/ INPUT DEVICE
31/ JOYSTICK
A/ VEHICLE BODY INCLINATION ANGLE (INCLINATION ANGULAR VELOCITY)
B/ INTER-VEHICLE DISTANCE
C/ RUNNING COMMAND
80/ COMMUNICATION CONTROL SYSTEM
81/ COMMUNICATION UNIT
25/ COMMUNICATION UNIT CONTROL ECU
D/—OPERATION AMOUNT
—VEHICLE SPEED
20/ CONTROL ECU
21/ MAIN CONTROL ECU
E/ DRIVE TORQUE COMMAND VALUE
F/ RIDING SECTION THRUST COMMAND VALUE
50/ DRIVE WHEEL CONTROL SYSTEM
22/ DRIVE WHEEL CONTROL ECU
60/ RIDING SECTION CONTROL SYSTEM
23/ RIDING SECTION CONTROL ECU
G/ DRIVE WHEEL ROTATION ANGLE (ROTATION ANGULAR VELOCITY)
H/ INPUT VOLTAGE
I/ RIDING SECTION POSITION (MOVEMENT SPEED)
51/ DRIVE WHEEL SENSOR
52/ DRIVE MOTOR
61/ RIDING SECTION SENSOR
62/ RIDING SECTION MOTOR

[FIG. 4]
S100/ START RUNNING AND ATTITUDE CONTROL PROCESS
S101/ ACQUIRE OPERATION AMOUNT GENERATED BY RIDER
S102/ DETERMINE TARGET VALUE OF VEHICLE ACCELERATION
S103/ CALCULATE TARGET VALUE OF DRIVE WHEEL ANGULAR VELOCITY
S104/ DETERMINE TARGET VALUES OF VEHICLE BODY INCLINATION ANGLE AND RIDING SECTION
S105/ CALCULATE REMAINING TARGET VALUES
S106/ DETERMINE FEEDFORWARD OUTPUT OF EACH ACTUATOR
S107/ ACQUIRE EACH STATE QUANTITY FROM SENSORS
S108/ CALCULATE REMAINING STATE QUANTITIES
S109/ DETERMINE FEEDBACK OUTPUT OF EACH ACTUATOR
S110/ GIVE EACH ELEMENT CONTROL SYSTEM COMMAND VALUE
S111/ RETURN

[FIG. 6]
S200/ START TARGET VALUE DETERMINATION PROCESS
S201/ OBTAIN $\theta_1^*$ USING FORMULA (2)
S202/ OBTAIN $\lambda_S^*$ USING FORMULA (5)
S205/ DETERMINE $\theta_1^*$ USING FORMULA (1) OR (3)
S206/ DETERMINE $\theta_1^*$ AND $\lambda_S^*$
S207/ END TARGET VALUE DETERMINATION PROCESS

[FIG. 8]
1/ PRECEDING VEHICLE A
2/ FOLLOWING VEHICLE B
81/ COMMUNICATION UNIT
3/ WIRELESS COMMUNICATION
$\alpha_1$/ PRECEDING VEHICLE ACCELERATION
$\alpha_2^*$/ FOLLOWING VEHICLE TARGET ACCELERATION
42/ INTER-VEHICLE DISTANCE SENSOR
d/ INTER-VEHICLE DISTANCE

[FIG. 9]
40/ VEHICLE BODY CONTROL SYSTEM
41/ VEHICLE BODY INCLINATION SENSOR
42/ INTER-VEHICLE DISTANCE SENSOR
30/ INPUT DEVICE
31/ JOYSTICK
A/ VEHICLE BODY INCLINATION ANGLE (INCLINATION ANGULAR VELOCITY)
B/ INTER-VEHICLE DISTANCE
C/ RUNNING COMMAND
80/ COMMUNICATION CONTROL SYSTEM
81/ COMMUNICATION UNIT
25/ COMMUNICATION UNIT CONTROL ECU
D/—OPERATION AMOUNT
—VEHICLE SPEED
20/ CONTROL ECU
21/ MAIN CONTROL ECU
E/ DRIVE TORQUE COMMAND VALUE
F/ RIDING SECTION THRUST COMMAND VALUE
50/ DRIVE WHEEL CONTROL SYSTEM
22/ DRIVE WHEEL CONTROL ECU
60/ RIDING SECTION CONTROL SYSTEM
23/ RIDING SECTION CONTROL ECU
G/ DRIVE WHEEL ROTATION ANGLE (ROTATION ANGULAR VELOCITY)
H/ INPUT VOLTAGE
I/ RIDING SECTION POSITION (MOVEMENT SPEED)
51/ DRIVE WHEEL SENSOR
52/ DRIVE MOTOR
61/ RIDING SECTION SENSOR
62/ RIDING SECTION MOTOR
J/ PRECEDING VEHICLE A
K/ VEHICLE-TO-VEHICLE WIRELESS COMMUNICATION
L/ FOLLOWING VEHICLE B

[FIG. 10]
S300/ START AUTOMATIC FOLLOW-UP CONTROL PROCESS
S301/ RECEIVE PRECEDING VEHICLE INFORMATION (VEHICLE SPEED, OPERATION AMOUNT)
S302/ STORE RECEIVED VEHICLE SPEED OF PRECEDING VEHICLE
S303/ CALCULATE ACCELERATION OF PRECEDING VEHICLE USING STORED VEHICLE SPEED INFORMATION
S304/ MEASURE VEHICLE SPEED OF HOST VEHICLE
S305/ MEASURE INTER-VEHICLE DISTANCE BETWEEN HOST VEHICLE AND PRECEDING VEHICLE
S306/ CALCULATE FIRST ACCELERATION COMMAND VALUE $\alpha_2$ OF HOST VEHICLE USING ACCELERATION AND VEHICLE SPEED OF PRECEDING VEHICLE, VEHICLE SPEED OF HOST VEHICLE, AND INTER-VEHICLE DISTANCE
S307/ CALCULATE SECOND ACCELERATION COMMAND VALUE $\alpha_2'$ OF HOST VEHICLE BASED ON JOYSTICK OPERATION AMOUNT OF PRECEDING VEHICLE
S308/ OPERATION OF PRECEDING VEHICLE IS DECELERATION INSTRUCTION?
S310/ USE $\alpha_2'$ AS TARGET ACCELERATION COMMAND VALUE $\alpha_2^*$
S311/ EXECUTE ACCELERATION COMMAND (DRIVE TORQUE COMMAND)
S312/ USE $\alpha_2$ AS TARGET ACCELERATION COMMAND VALUE $\alpha_2^*$
S314/ USE $\alpha_2$ AS TARGET ACCELERATION COMMAND VALUE $\alpha_2^*$
S315/ USE $\alpha_2'$ AS TARGET ACCELERATION COMMAND VALUE $\alpha_2^*$

[FIG. 11]
S400/ START AUTOMATIC FOLLOW-UP CONTROL PROCESS
S401/ RECEIVE PRECEDING VEHICLE INFORMATION (VEHICLE SPEED, ACCELERATION COMMAND VALUE)
S402/ STORE RECEIVED VEHICLE SPEED OF PRECEDING VEHICLE
S403/ CALCULATE ACCELERATION OF PRECEDING VEHICLE USING STORED VEHICLE SPEED INFORMATION
S404/ MEASURE VEHICLE SPEED OF HOST VEHICLE
S405/ MEASURE INTER-VEHICLE DISTANCE BETWEEN HOST VEHICLE AND PRECEDING VEHICLE
S406/ CALCULATE FIRST ACCELERATION COMMAND VALUE $\alpha_2$ OF HOST VEHICLE USING ACCELERATION AND VEHICLE SPEED OF PRECEDING VEHICLE, VEHICLE SPEED OF HOST VEHICLE, AND INTER-VEHICLE DISTANCE
S407/ CALCULATE SECOND ACCELERATION COMMAND VALUE $\alpha_2'$ OF HOST VEHICLE USING ACCELERATION COMMAND VALUE AND VEHICLE SPEED OF PRECEDING VEHICLE, VEHICLE SPEED OF HOST VEHICLE, AND INTER-VEHICLE DISTANCE
S408/ ACCELERATION COMMAND VALUE OF PRECEDING VEHICLE NEGATIVE?
S410/ USE $\alpha_{2a}'$ AS TARGET ACCELERATION COMMAND VALUE $\alpha_2^*$
S411/ EXECUTE ACCELERATION COMMAND (DRIVE TORQUE COMMAND)
S412/ USE $\alpha_2$ AS TARGET ACCELERATION COMMAND VALUE $\alpha_2^*$
S414/ USE $\alpha_2$ AS TARGET ACCELERATION COMMAND VALUE $\alpha_2^*$
S415/ USE $\alpha_{2a}'$ AS TARGET ACCELERATION COMMAND VALUE $\alpha_2^*$

[FIG. 12]
S500/ START AUTOMATIC FOLLOW-UP CONTROL PROCESS
S501/ RECEIVE PRECEDING VEHICLE INFORMATION (VEHICLE SPEED, ACCELERATION COMMAND VALUE)
S502/ MEASURE VEHICLE SPEED OF HOST VEHICLE
S503/ MEASURE INTER-VEHICLE DISTANCE BETWEEN HOST VEHICLE AND PRECEDING VEHICLE
S504/ CALCULATE SECOND ACCELERATION COMMAND VALUE $\alpha_{2a}'$ OF HOST VEHICLE USING ACCELERATION COMMAND VALUE AND VEHICLE SPEED OF PRECEDING VEHICLE, VEHICLE SPEED OF HOST VEHICLE, AND INTER-VEHICLE DISTANCE
S505/ USE $\alpha_{2a}'$ AS TARGET ACCELERATION COMMAND VALUE $\alpha_2^*$
S506/ EXECUTE ACCELERATION COMMAND (DRIVE TORQUE COMMAND)

The invention claimed is:

1. A vehicle control device controlling a vehicle so as to follow a preceding vehicle performing an inversion control, the vehicle control device comprising:
a communication unit configured to receive a vehicle speed of the preceding vehicle and an operation amount of a maneuvering device that maneuvers the preceding vehicle;
an inter-vehicle distance sensor configured to measure an inter-vehicle distance between the preceding vehicle and a vehicle following the preceding vehicle;
computation means for computing an acceleration command value of the vehicle following the preceding vehicle, wherein
the computation means is configured to set one of a first acceleration command value, which is computed based on a vehicle speed of the preceding vehicle received by the communication unit and the inter-vehicle distance measured by the inter-vehicle distance sensor, and a second acceleration command value, which is computed based on the operation amount of the maneuvering device received by the communication unit, as a target acceleration command value, by determining whether acceleration of the preceding vehicle performing the inversion control is a normal acceleration operation or an acceleration counter-operation.

2. The vehicle control device according to claim 1, wherein the computation means is configured to set a smaller value among the first acceleration command value and the second acceleration command value as the target acceleration command value if output of a deceleration command to the preceding vehicle is determined based on the operation amount of the maneuvering device.

3. The vehicle control device according to claim 2, wherein the computation means is configured to set a larger value among the first acceleration command value and the second acceleration command value as the target acceleration command value if output of an acceleration command to the preceding vehicle is determined based on the operation amount of the maneuvering device.

4. The vehicle control device according to claim 3, wherein the vehicle speed is obtained from a wheel rotational speed.

5. The vehicle control device according to claim 2, wherein the vehicle speed is obtained from a wheel rotational speed.

6. The vehicle control device according to claim 1, wherein the computation means is configured to set a larger value among the first acceleration command value and the second acceleration command value as the target acceleration command value if output of an acceleration command to the preceding vehicle is determined based on the operation amount of the maneuvering device.

7. The vehicle control device according to claim 6, wherein the vehicle speed is obtained from a wheel rotational speed.

8. The vehicle control device according to claim 1, wherein the vehicle speed is obtained from a wheel rotational speed.

9. A vehicle control device controlling a vehicle so as to follow a preceding vehicle performing an inversion control, the vehicle control device comprising:
  a communication unit configured to receive a vehicle speed of the preceding vehicle and an acceleration command value of the preceding vehicle;
  an inter-vehicle distance sensor configured to measure an inter-vehicle distance between the preceding vehicle and a vehicle following the preceding vehicle; and
  computation means for computing an acceleration command value of the vehicle following the preceding vehicle, wherein
  the computation means is configured to set one of a first acceleration command value, which is computed based on a vehicle speed of the preceding vehicle received by the communication unit and the inter-vehicle distance measured by the inter-vehicle distance sensor, and a second acceleration command value, which is computed based on an acceleration command value of the preceding vehicle received by the communication unit, as a target acceleration command value, by determining whether acceleration of the preceding vehicle performing the inversion control is a normal acceleration operation or an acceleration counter-operation.

10. The vehicle control device according to claim 9, wherein
  the computation means is configured to set a smaller value among the first acceleration command value and the second acceleration command value as the target acceleration command value if the acceleration command value of the preceding vehicle is determined to be negative.

11. The vehicle control device according to claim 10, wherein
  the computation means is configured to set a larger value among the first acceleration command value and the second acceleration command value as the target acceleration command value if the acceleration command value of the preceding vehicle is determined to be not negative.

12. The vehicle control device according to claim 11, wherein
  the vehicle speed is obtained from a wheel rotational speed.

13. The vehicle control device according to claim 10, wherein
  the vehicle speed is obtained from a wheel rotational speed.

14. The vehicle control device according to claim 9, wherein
  the vehicle speed is obtained from a wheel rotational speed.

15. The vehicle control device according to claim 9, wherein
  the computation means is configured to set a larger value among the first acceleration command value and the second acceleration command value as the target acceleration command value if the acceleration command value of the preceding vehicle is determined to be not negative.

16. The vehicle control device according to claim 15, wherein
  the vehicle speed is obtained from a wheel rotational speed.

* * * * *